United States Patent
Kimura et al.

(10) Patent No.: US 9,483,220 B2
(45) Date of Patent: Nov. 1, 2016

(54) IMAGE PROCESSING SYSTEM, MANAGEMENT SYSTEM, IMAGE PROCESSING APPARATUS AND METHOD OF PROOFREADING DOCUMENT

(71) Applicants: Atsushi Kimura, Kanagawa (JP); Tomoyuki Tazuke, Tokyo (JP); Takahiro Kameda, Tokyo (JP)

(72) Inventors: Atsushi Kimura, Kanagawa (JP); Tomoyuki Tazuke, Tokyo (JP); Takahiro Kameda, Tokyo (JP)

(73) Assignee: Ricoh Company, Ltd., Tokyo (JP)

(*) Notice: Subject to any disclaimer, the term of this patent is extended or adjusted under 35 U.S.C. 154(b) by 0 days.

(21) Appl. No.: 14/922,311

(22) Filed: Oct. 26, 2015

(65) Prior Publication Data

US 2016/0124690 A1     May 5, 2016

(30) Foreign Application Priority Data

Oct. 31, 2014    (JP) ................................ 2014-223087

(51) Int. Cl.
    *G06F 3/12*      (2006.01)
    *H04N 1/00*      (2006.01)

(52) U.S. Cl.
CPC ........... *G06F 3/1241* (2013.01); *G06F 3/1252* (2013.01); *G06F 3/1273* (2013.01); *G06F 3/1275* (2013.01); *H04N 1/00803* (2013.01); *H04N 1/00867* (2013.01); *H04N 2201/0094* (2013.01)

(58) Field of Classification Search
None
See application file for complete search history.

(56) References Cited

U.S. PATENT DOCUMENTS

| | | | | |
|---|---|---|---|---|
| 7,489,415 B2* | 2/2009 | Furuta | ................. | G06K 9/2054 |
| | | | | 358/1.15 |
| 7,783,885 B2* | 8/2010 | Dietl | ..................... | G06Q 10/10 |
| | | | | 283/113 |
| 7,806,334 B2* | 10/2010 | Katsurabayashi | ..... | G06Q 10/06 |
| | | | | 235/375 |
| 7,999,963 B2* | 8/2011 | Negishi | ............. | H04N 1/00408 |
| | | | | 358/1.1 |
| 8,368,934 B2* | 2/2013 | Inose | ................... | G06T 1/0021 |
| | | | | 358/1.14 |

(Continued)

FOREIGN PATENT DOCUMENTS

| | | |
|---|---|---|
| JP | 2002-203054 | 7/2002 |
| JP | 2003-223438 | 8/2003 |

(Continued)

*Primary Examiner* — Dung Tran
(74) *Attorney, Agent, or Firm* — Ipusa, PLLC

(57) ABSTRACT

There is provided a management system for managing a manuscript of a book in a plurality of steps, works serially performed on the manuscript being divided into the steps, the management system comprising: a print control unit configured to generate data for printing out sheets in response to receiving a print request of manuscript data, respective pages in the manuscript data being incorporated in the sheets, wherein the manuscript data is generated by digitizing the manuscript including the respective pages, and the respective sheets include identification information items which are made unique on a sheet-by-sheet basis and used for determining properness of the respective sheets, the identification information items indicating a step among the steps which includes a work most lately performed.

12 Claims, 21 Drawing Sheets

(56) References Cited

U.S. PATENT DOCUMENTS

| | | | | |
|---|---|---|---|---|
| 8,526,024 B2* | 9/2013 | Fukushima | G06F 17/30011 | 358/1.13 |
| 8,539,591 B2* | 9/2013 | Eguchi | G06F 21/608 | 358/1.14 |
| 8,630,004 B2* | 1/2014 | Iwamoto | G06Q 30/00 | 358/1.15 |
| 8,670,140 B2* | 3/2014 | Bellotti | G06Q 10/06 | 347/101 |
| 8,797,603 B1* | 8/2014 | Dougherty | H04N 1/2166 | 358/1.15 |
| 8,804,159 B2* | 8/2014 | Mori | G06F 21/121 | 358/1.14 |
| 8,976,383 B2* | 3/2015 | Qi | G06F 3/1238 | 358/1.14 |
| 9,223,528 B2* | 12/2015 | Tecu | G06F 3/1275 | |
| 2007/0136121 A1* | 6/2007 | Katsurabayashi | G06Q 10/06 | 705/7.26 |
| 2007/0177824 A1* | 8/2007 | Cattrone | G06F 17/30011 | 382/306 |
| 2009/0063567 A1* | 3/2009 | Matsunaga | G06F 17/30011 | |
| 2013/0100464 A1* | 4/2013 | Liu | G06F 3/1206 | 358/1.9 |
| 2014/0027504 A1* | 1/2014 | Ming | G06F 21/10 | 235/375 |
| 2016/0110320 A1* | 4/2016 | Balinsky | G06F 17/2229 | 358/1.15 |

FOREIGN PATENT DOCUMENTS

| | | |
|---|---|---|
| JP | 2006-092100 | 4/2006 |
| JP | 3888428 | 3/2007 |
| JP | 4345621 | 10/2009 |

* cited by examiner

FIG.9

| BOOK CODE | TITLE | AUTHOR | EDITOR/ PROOFREADER | NOTIFI- CATION PARTIES | STEP | DATE | STEP CODE | SCANNING DATA | MANU- SCRIPT DATA | PROOF- READING PAPER ID | MANUSCRIPT DATA FOR PROOFREADING | PROOF- READING FINISH |
|---|---|---|---|---|---|---|---|---|---|---|---|---|
| | α α | β β | AAAA(001A)/ BBBB(002B) | | ORIGINAL | | | pdf1s | pdf1d | | pdf1p | |
| | | | | | PROOF- READING (FIRST) | | | pdf2s | pdf2d | ... | pdf2p | |
| | | | | | PROOF- READING (SECOND) | | | pdf3s | pdf3d | | pdf3p | |
| | | | | | FINISH- ING | | | | pdf_final | | | ✓ |

CONTENT OF TWO-DIMENSIONAL CODE

1234567890AB,1234567890ABCDEFGH,001/300
BOOK CODE    STEP CODE    SHEET NUMBER/ TOTAL NUMBER OF SHEETS

FIG.17B

| SCANNING DATA | CONTENT OF TWO-DIMENSIONAL CODE |
|---|---|
| SCANNING DATA 1st SHEET | 1234567890AB,1234567890ABCDEFGH,001/300 |
| ... | ... |
| SCANNING DATA 100th SHEET | 1234567779AA,1234567890ABCDEFGH,100/300 |
| ... | ... |
| SCANNING DATA 180th SHEET | 1234567890AB,1234567890ABC99999,180/300 |
| ... | ... |
| SCANNING DATA 298th SHEET | 1234567890AB,1234567890ABCDEFGH,298/300 |
| SCANNING DATA 299th SHEET | 1234567890AB,1234567890ABCDEFGH,299/300 |
| SCANNING DATA 300th SHEET | 1234567890AB,1234567890ABCDEFGH,300/300 |

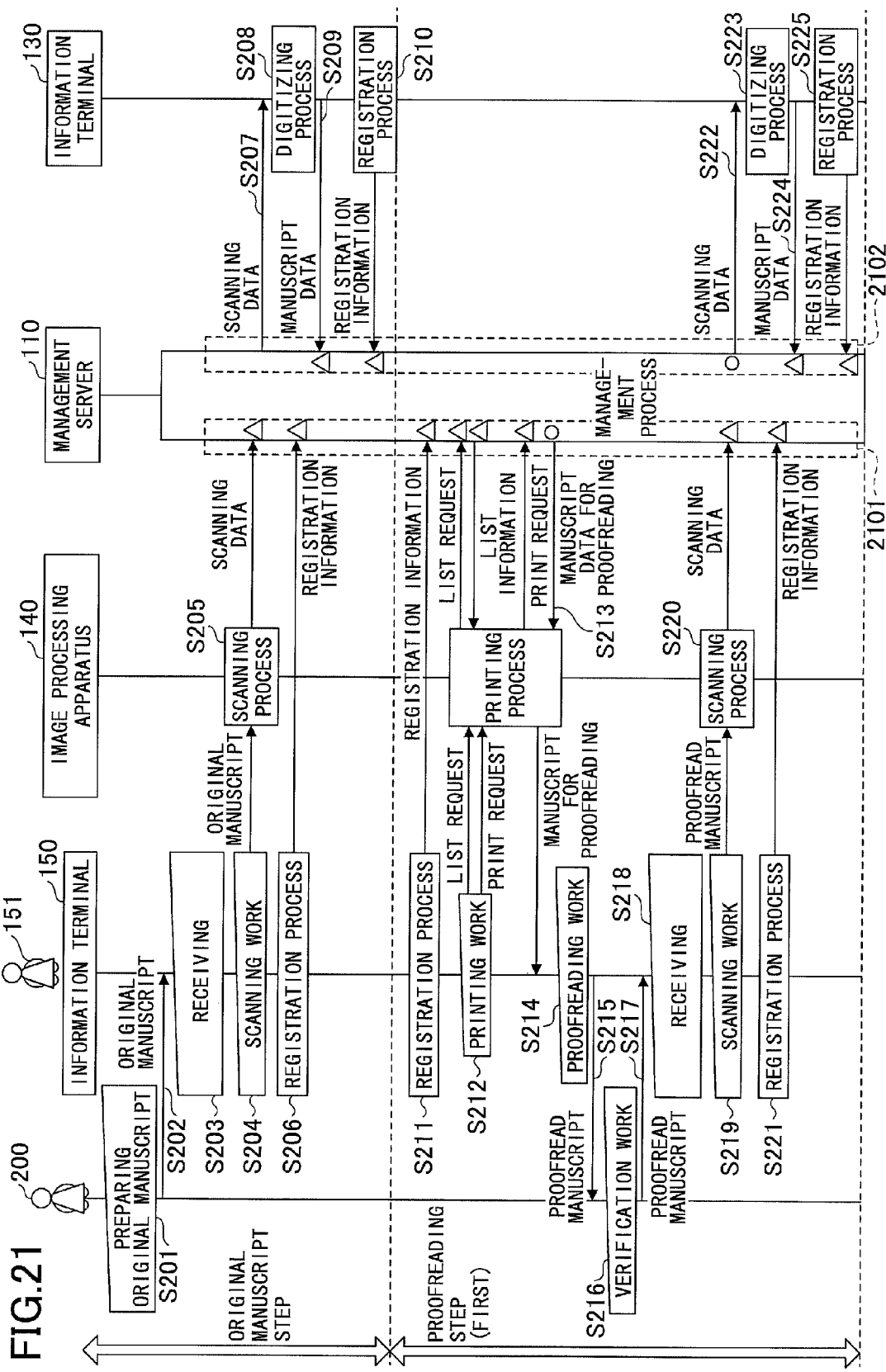

IMAGE PROCESSING SYSTEM, MANAGEMENT SYSTEM, IMAGE PROCESSING APPARATUS AND METHOD OF PROOFREADING DOCUMENT

BACKGROUND OF THE INVENTION

1. Field of the Invention

The present disclosure relates to an image processing system, a management system, an image processing apparatus and a method of proofreading document.

2. Description of the Related Art

Generally, in a case where books such as a novel are published, various works or operations by a plurality of workers are performed in respective steps until publishing them.

Specifically, when a manuscript of a novel is sent from an author of the novel to a publishing company, an operator performs a work for digitizing the manuscript and an editor prints out the digitized manuscript to perform a proofreading work which is referred to red-word-writing-in. Then, the proofread manuscript is sent to the author. Upon the author confirming the proofread manuscript, the manuscript is sent back to the publishing company to be digitized again by the operator. Usually, in the publishing company, these steps are repeated several times. Therefore works such as scanning the manuscript or printing the manuscript data using an image processing apparatus are increased.

For example, as for the image processing apparatus used in the respective steps until publishing books, a design is proposed, by which works such as scanning or printing are easily performed, thereby achieving cost reduction.

Meanwhile, as described above, in a case where the works such as scanning or printing are repeatedly performed, various operation errors such as page missing or mixing with other manuscript's page may occur. Therefore, measures for preventing the operation errors in the works using the image processing apparatus are required.

RELATED ART DOCUMENT

Patent Document

[Patent Document 1]: Japanese Laid-open Patent Publication No. 2006-92100

SUMMARY OF THE INVENTION

An object of disclosure of the present technology is to prevent operation error in respective steps until publishing books.

The following configuration is adopted to achieve the aforementioned object.

In one aspect of the embodiment, there is provided a management system for managing a manuscript of a book in a plurality of steps, works serially performed on the manuscript being divided into the steps, the management system comprising: a print control unit configured to generate data for printing out sheets in response to receiving a print request of manuscript data, respective pages in the manuscript data being incorporated in the sheets, wherein the manuscript data is generated by digitizing the manuscript including the respective pages, and the respective sheets include identification information items which are made unique on a sheet-by-sheet basis and used for determining properness of the respective sheets, the identification information items indicating a step among the steps which includes a work most lately performed.

Other objects, features and advantages of the present invention will become more apparent from the following detailed description when read in conjunction with the accompanying drawings.

BRIEF DESCRIPTION OF THE DRAWINGS

FIG. 9 is a diagram for illustrating an example of the management information.

FIG. 17A is a diagram for illustrating an example content of a two-dimensional code.

FIG. 17B is a diagram for illustrating examples contents of the two-dimensional codes.

FIG. 21 is a sequence diagram for illustrating charge opportunities.

DETAILED DESCRIPTION OF THE PREFERRED EMBODIMENTS

Figure 1:
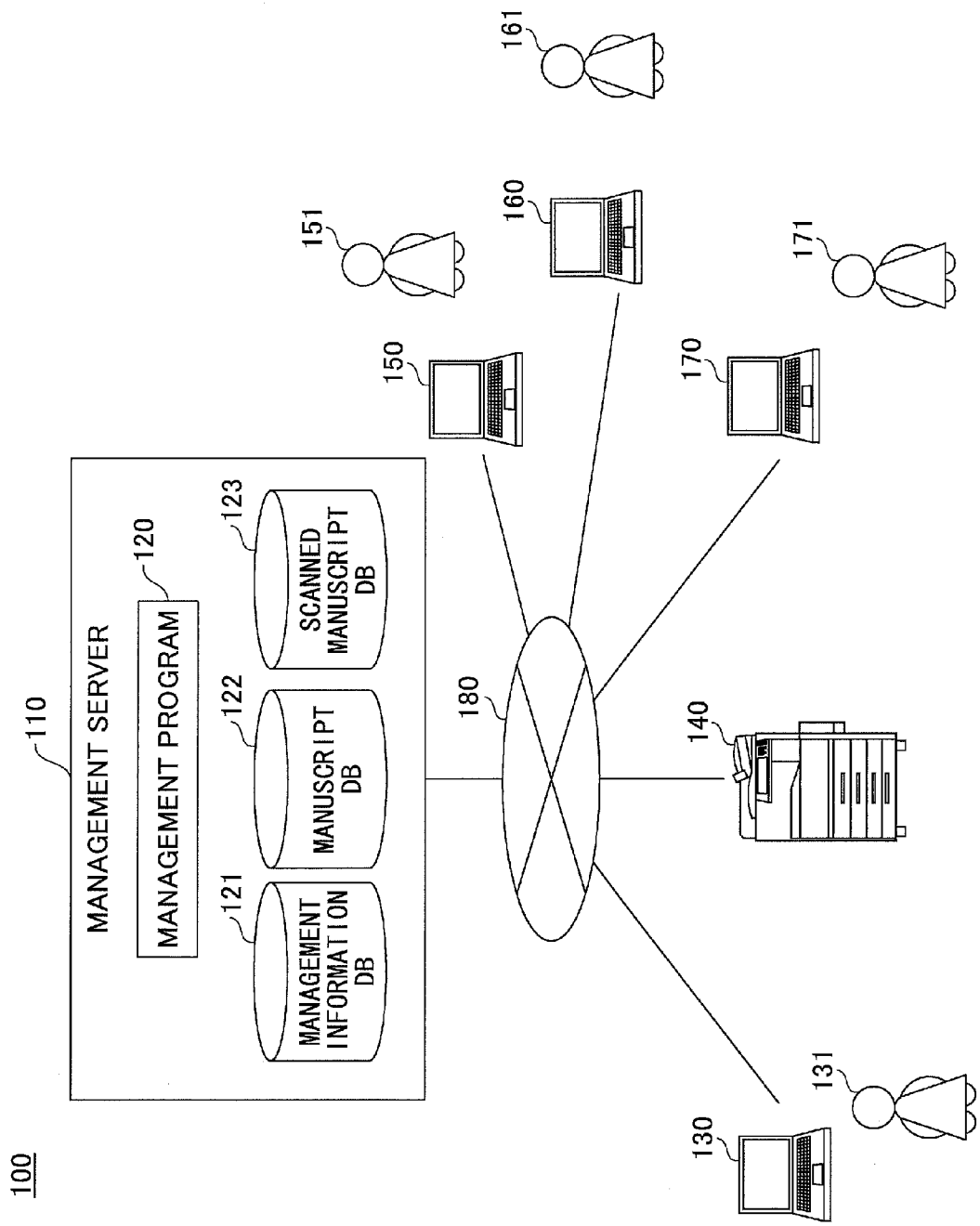
FIG. 1 is a diagram for illustrating an entire configuration of an image processing system.

Herein below, embodiments will be described with reference to the accompanying drawings. Additionally, in respective embodiments, an identical reference numeral will be applied to an element or the like that has substantially similar functions and configurations to that in another embodiment, and descriptions thereof will be omitted.

<First Embodiment>

<1. Configuration of Image Processing System>

First, an entire configuration of an image processing system will be described. FIG. 1 is a diagram for illustrating an entire configuration of an image processing system.

As shown in FIG. 1, an image processing system 100 includes a management server 110, an information terminal 130, an image processing apparatus 140 and information terminals 150-170. The management server 110, the information terminal 130, the image processing apparatus 140 and the information terminals 150-170 are connected capable of communicating with each other through a network 180.

The management server 110 includes a management program 120, a management information database (hereinafter referred to as DB) 121, a manuscript DB 122 and a scanned manuscript DB 123.

The management program 120 performs management processes for managing a manuscript of a book such as a novel in respective steps where works or operations (hereinafter such works or operations are simply referred to as works) until the book is published are divided into the respective steps according to content thereof. Also, the management information DB 121 stores management information used for managing of the manuscript with the management program 120.

The manuscript DB 122 stores "manuscript data" obtained by digitizing the manuscript. Here, the term "manuscript" includes not only "original manuscript" sent from an author of the book such as a novel, but also "proofread manuscript", on which an editor or a proofreader prints out the manuscript data to performs a proofreading work (e.g., a work for correcting words in the manuscript by overwriting words in red) referred to as red-word-writing-in, where the manuscript on which the proofreading work has been performed is referred to as "proofread manuscript".

The scanned manuscript DB 123 stores "scanning data" obtained by scanning the manuscript (original manuscript or proofread manuscript) to be digitized.

The information terminal 130 is a terminal used by an operator 131 for digitizing the manuscript. In a case where the manuscript to be digitized is scanned and the scanning data is stored in the scanned manuscript DB 123, the information terminal 130 retrieves the scanning data and the operator 131 digitizes the manuscript by typing handwritten characters to input them as electronic data. Also, the information terminal 130 stores manuscript data obtained by digitizing the manuscript in the manuscript DB 122.

The image processing apparatus 140 is an apparatus such as a MFP (Multi-function Peripheral) having a scanning function and a printing function. The image processing apparatus 140 is used when the editor/proofreader prints out the manuscript data, or the manuscript to be digitized is scanned.

The information terminal 150 is operated by the editor or a proofreader 151. The information terminal 160 and 170 are operated by supervisors 161 and 171 who supervise the editor/proofreader 151. The information terminals 150-170 access the management server 110, write respective information items into the management information stored in the management information DB 121, retrieve the management information to display it so as to be read by the editor/proofreader 151, and the supervisors 161 and 171.

Additionally, in the example shown in FIG. 1, although the management program 120 is executed by one management server 110, a part of the management program 120 may be executed by another server. Also, in the example shown in FIG. 1, although one management server 110 includes the management information DB 121, the manuscript DB 122 and the scanned manuscript DB 123, the management information DB 121, the manuscript DB 122 and the scanned manuscript DB 123 may be respectively included in discrete servers.

That is, the management server 110 may be configured by a management system including a plurality of servers.

<2. Flow of Works in Respective Steps Until Book is Published>

Figure 2:
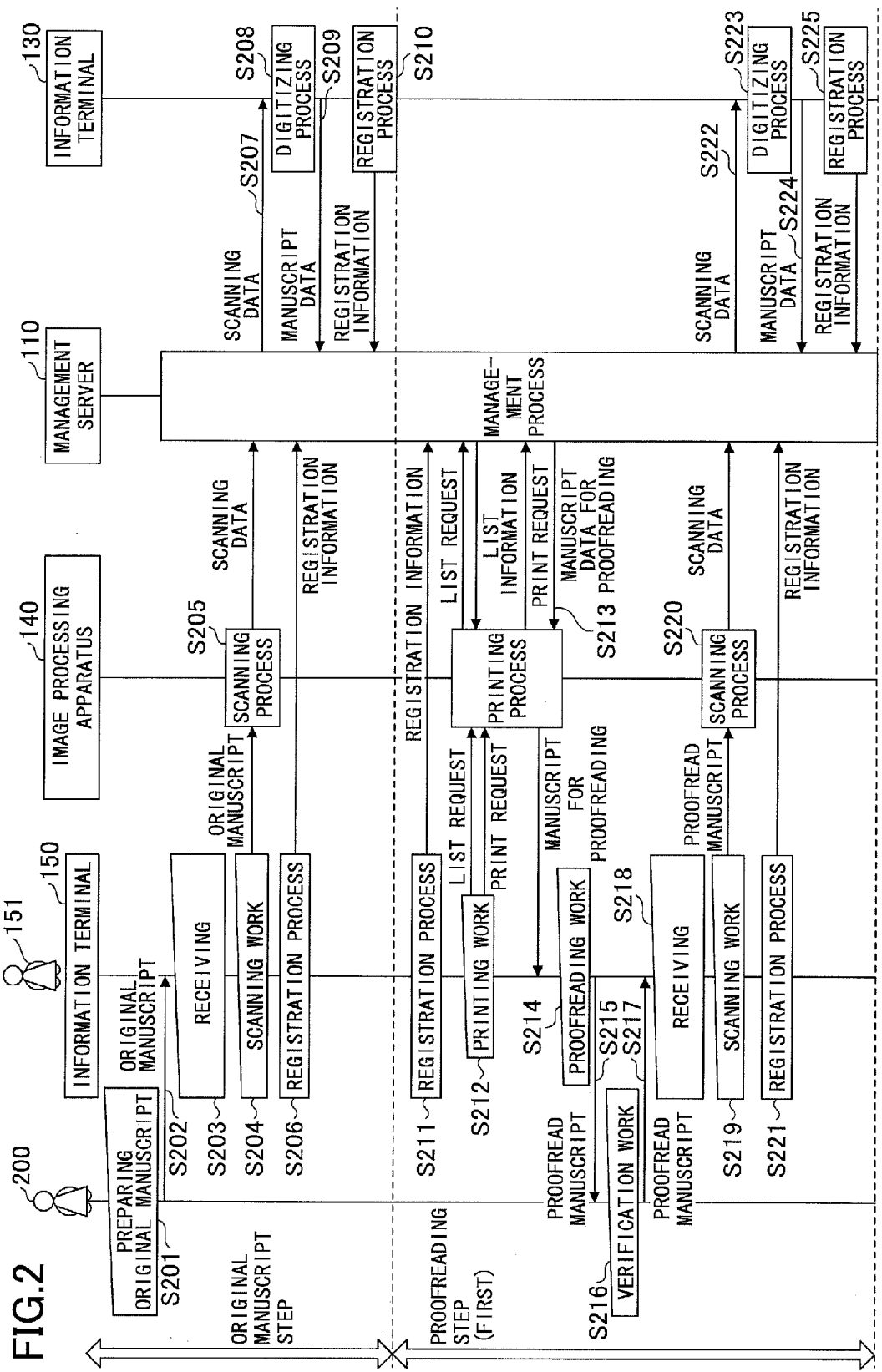
FIG. 2 is a sequence diagram for illustrating a flow of works in respective steps until the book is published.
Figure 3:
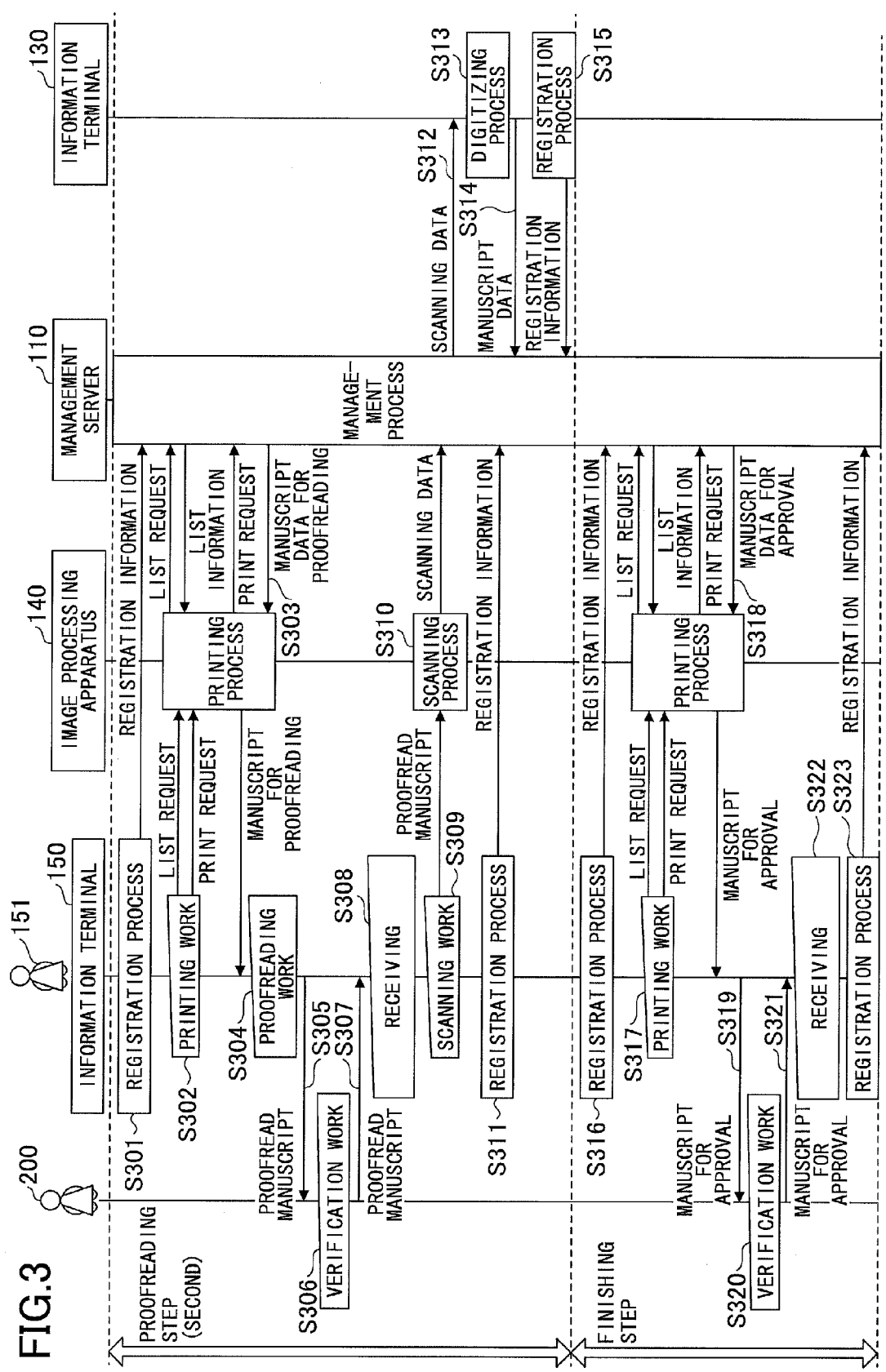
FIG. 3 is another sequence diagram for illustrating a flow of works in respective steps until the book is published.

In the following, a flow of works in respective steps until the book is published is described with reference to FIG. 2 and FIG. 3. FIG. 2 is a sequence diagram for illustrating a flow of works in respective steps until the book is published. FIG. 3 is another sequence diagram for illustrating a flow of works in respective steps until the book is published.

In step S201, the author 200 of the book prepares the original manuscript and sends the prepared original manuscript to the editor/proofreader 151 in step S202.

In step S203, the editor/proofreader 151 receives the original manuscript from the author 200. In step S204, the editor/proofreader 151 performs a scanning work for scanning the received original manuscript by using the image processing apparatus 140. Specifically, the original manuscript is set on the image processing apparatus 140 and an instruction to scan is given to the information processing apparatus 140.

Upon receiving the instruction to scan, in step S205, the image processing apparatus 140 starts to scan the manuscript. Thus, sheets of the set manuscript are fed to a scanning position, and PDF (Portable Document Format) data of the original manuscript is created. Also, the PDF data of the original manuscript is sent as the scanning data to the management server 110 and is stored in a certain storage area in the scanned manuscript DB 123.

In step S206, the information terminal 150 performs a registration process for writing registration information regarding the original manuscript to be recorded into the management information stored in the management information DB 121. For example, registration information regarding the original manuscript to be recorded includes a name of author, or a title of the book. Also, a name and an ID (Identification) of the editor/proofreader 151 who is in charge of the original manuscript, a name and an ID of the supervisors 161 and 171 supervising the editor/proofreader 151 and a name and an ID of the operator 131 are included. Further, a file name or storage address of the scanning data, book code which is unique to each book, etc., are included.

In step S207, the information terminal 130 retrieves the scanning data stored in the scanned manuscript DB 123. In step S208, the information terminal 130 generates the manuscript data by digitizing the retrieved scanning data.

In step S209, the information terminal 130 transmits the manuscript data to the management server 110. Thus, the manuscript data is stored in a certain storage area in the manuscript DB 122.

In step S210, the information terminal 130 performs a registration process for writing the registration information regarding the manuscript data to be recorded into the management information stored in the management information DB 121. The registration information regarding the manuscript data to be recorded includes a file name of the manuscript data and the storage address thereof.

Additionally, in the present embodiment, works and processes up to this point are referred to as "original manuscript step". That is, from the process for scanning the original manuscript to the process for generating and storing the manuscript data are included in the original manuscript step. A unique step code is allocated to the original manuscript step. Also, the registration information written in step S206 includes the step code of the original manuscript step and a name of the step.

When new manuscript data is stored in the manuscript DB 122, in step S211, the information terminal 150 performs a registration process. Specifically, the step code uniquely indicating proofreading step (first) and a name of the step are transmitted as the registration information to the management server 110. Thus, the transmitted registration information is recorded in the management information stored in the management information DB 121.

In step S212, the editor/proofreader 151 performs a printing work. Specifically, the editor/proofreader 151 logs in the image processing apparatus 140 to request a list of the manuscript data which can be printed out by the editor/proofreader 151. The image processing apparatus 140 transmits a list request to the management server 110. In response to receiving the list request from the image processing apparatus 140, the management server 110 transmits list information indicating the manuscript data which can be printed out by the editor/proofreader 151 with reference to the content of the management information DB 121. Upon receiving the list information, the image processing apparatus 140 displays the list information, and thereby accepts selection of the manuscript data and print request by the editor/proofreader 151. Further, the image processing apparatus 140 transmits the print request of the selected manuscript data to the management server 110.

In step S213, the management server 110 generates "manuscript data for proofreading" based on manuscript data which is requested to be printed and transmits the generated "manuscript data for proofreading" to the image processing apparatus 140, thereby having the image processing apparatus 140 perform a printing process. Thus, the editor/proofreader 151 can obtain "manuscript for proofreading".

In step S214, the editor/proofreader 151 performs a proofreading work (referred to as the red-word-writing-in) on the obtained manuscript for proofreading. In step S215, the editor/proofreader 151 sends a proofread manuscript to the author 200, which can be obtained by performing the proofreading work on the manuscript for proofreading.

In response to receiving the proofread manuscript, in step S216, the author 200 performs a verification work for verifying the proofread manuscript. In step S217, the author 200 sends the proofread manuscript on which the verification work has been performed to the editor/proofreader 151.

In step S218, the editor/proofreader 151 receives the proofread manuscript on which the verification work has been performed. In step S219, the editor/proofreader 151 performs a scanning work on the received proofread manuscript to scan it by using the image processing apparatus 140. Specifically, the editor/proofreader 151 sets the proofread manuscript on the image processing apparatus 140 and gives instruction to scan the set manuscript to the image processing apparatus 140.

Upon accepting the instruction to scan, in step S220, the image processing apparatus 140 starts to perform the scanning process. Thus, sheets of the set proofread manuscript are fed to a scanning position, and PDF (Portable Document Format) data of the proofread manuscript is created. Also, the image processing apparatus 140 stores the PDF data of the proofread manuscript as the scanning data in a certain storage area in the scanned manuscript DB 123.

In step S221, the information terminal 150 performs the registration process for writing registration information regarding the proofread manuscript to be recorded into the management information stored in the management information DB 121. The registration information regarding the proofread manuscript to be recorded includes a file name of the scanning data and the storage address thereof.

In step S222, the information terminal 130 retrieves the scanning data stored in the scanned manuscript DB 123. In step S223, the information terminal 130 digitizes the retrieved scanned data to generate the manuscript data.

In step S224, the information terminal 130 transmits the manuscript data to the management server 110. Thus, the manuscript data is stored in a certain storage area in the manuscript DB 122.

In step S225, the information terminal 130 performs a registration process for writing the registration information regarding the manuscript data to be recorded into the management information stored in the management information DB 121. The registration information regarding the manuscript data to be recorded includes a file name of the manuscript data and the storage address thereof. Thus, the proofreading step (first) ends. Then, with reference to FIG. 3, the proofreading step (second) starts.

In step S301, the information terminal 150 performs a registration process. Specifically, the step code uniquely indicating proofreading step (second) and a name of the step are transmitted as the registration information to the management server 110. Thus, the transmitted registration information is recorded in the management information stored in the management information DB 121.

Works and processes performed in steps S302-S315 are similar to those performed in steps S211-S225, therefore, the descriptions thereof are omitted. Although, in FIG. 3, the proofreading step (second) is performed, the proofreading step (second) is not necessary to be performed. Also, the proofreading step (third), the proofreading step (fourth), etc., may be performed if needed.

Upon the proofreading step being ended, a finishing step starts. In step S316, the information terminal 150 performs the registration process. Specifically, the step code uniquely indicating finishing step and a name of the step are transmitted as the registration information to the management server 110. Thus, the transmitted registration information is recorded in the management information stored in the management information DB 121.

In step S317, the editor/proofreader 151 performs a printing work. Specifically, the editor/proofreader 151 logs in the image processing apparatus 140 to request the list of the manuscript data which can be printed out by the editor/proofreader 151. The image processing apparatus 140 transmits the list request to the management server 110. In response to receiving the list request from the image processing apparatus 140, the management server 110 transmits the list information indicating the manuscript data which can be printed out by the editor/proofreader 151 with reference to the content of the management information DB 121. Upon receiving the list information, the image processing apparatus 140 displays the list information, and thereby accepts selection of the manuscript data and print request from the editor/proofreader 151. Further, the image processing apparatus 140 transmits the print request of the selected manuscript data to the management server 110.

In step S318, the management server 110 generates "manuscript data for approval" based on manuscript data which is requested to be printed and transmits the generated "manuscript data for approval" to the image processing apparatus 140, thereby having the image processing apparatus 140 perform a printing process. Thus, the editor/proofreader 151 can obtain "manuscript for approval". Additionally, in the present embodiment, the manuscript data for approval is generated in the same format as that of the manuscript data for proofreading.

In step S319, the editor/proofreader 151 sends the manuscript for approval to the author 200. In step S320, upon receiving the manuscript for approval, the author 200 performs an approval work for approving the obtained manuscript for approval. In step S321, the author 200 sends the approved manuscript for approval to the editor/proofreader 151.

In step S322, the editor/proofreader 151 receives the manuscript for approval. In step S323, the information terminal 150 performs a registration process. Specifically, information (proofreading finish information) indicating a completion of proofreading step is transmitted as the registration information to the management information DB 121. Thus, the transmitted registration information is recorded in the management information stored in the management information DB 121. Thus, the finishing step has ended.

Then, upon the proofreading finish information being recorded, the editor/proofreader 151 performs a publishing work by using the latest manuscript data stored in the management server 110. Thus, the book is ready to be published through a bookbinding process performed on the manuscript data.

<2. Hardware Configuration of Management Server>

Figure 4:
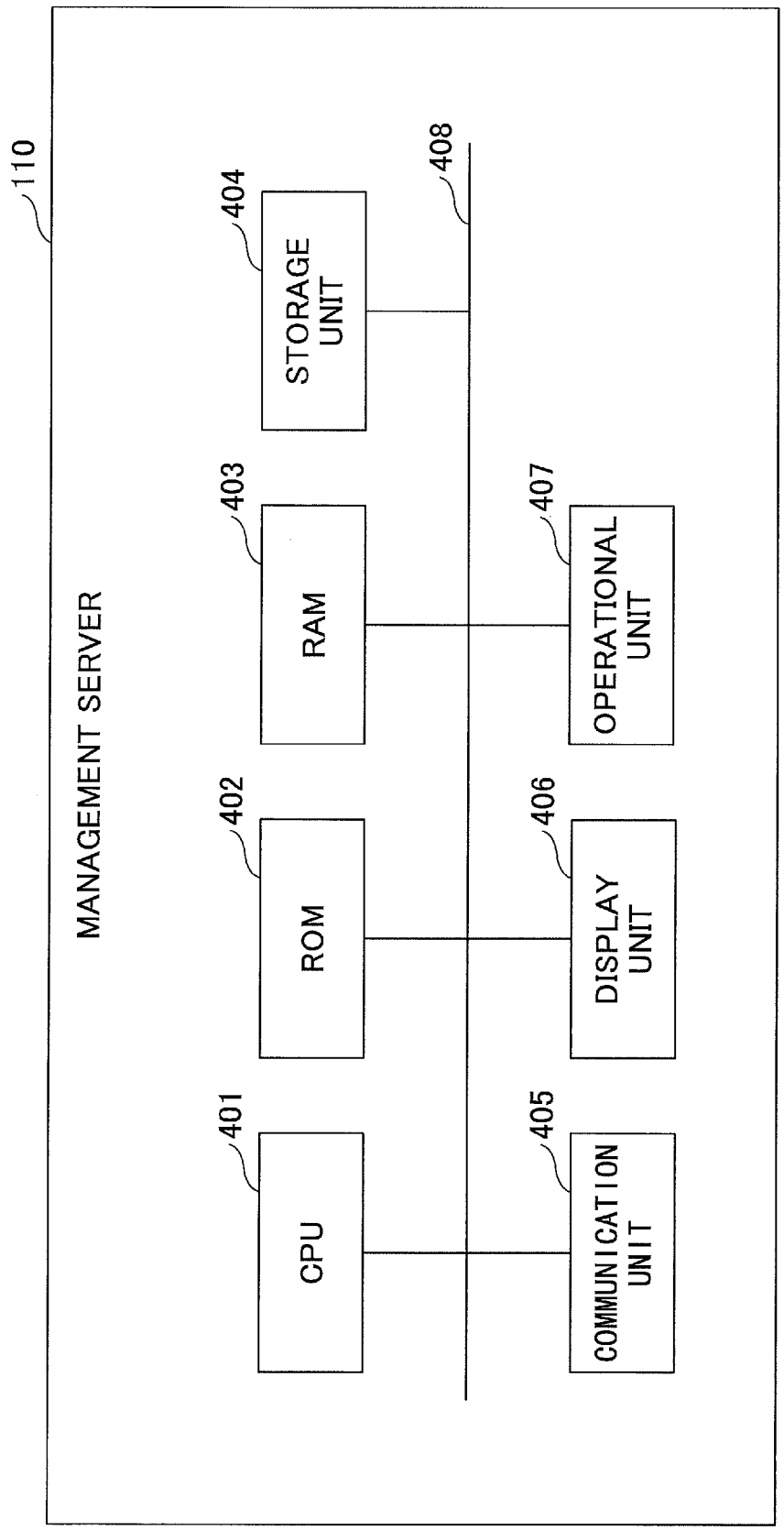
FIG. 4 is a block diagram for illustrating an example hardware configuration of the management server 110.

In the following, a hardware configuration of the management server 110 is described. FIG. 4 is a block diagram for illustrating an example hardware configuration of the management server 110.

As shown in FIG. 4, the management server 110 includes a CPU (Central Processing Unit) 401, a ROM (Read Only Memory) 402, a RAM (Random Access Memory) 403 and a storage unit 404. Further, the management server 110 includes a communication unit 405, a display unit 406 and an operational unit 407. Additionally, the respective units of the management server 110 are connected with each other through a bus 408.

The CPU 401 is a computer for executing respective programs (for example, management program 120) stored in the storage unit 404.

The ROM 402 is a nonvolatile memory. The ROM 402 stores programs and data necessary for executing the respective programs stored in the storage unit 404 by the CPU 401. Specifically, boot programs such as BIOS (Basic Input/Output System) or EFI (Extensible Firmware Interface), etc., are stored in the ROM 402.

The RAM 403 is a main memory such as a DRAM (Dynamic Random Access Memory) or a SRAM (Static Random Access Memory). The RAM 403 serves as a work area in which the respective programs stored in the storage unit 404 are loaded to be executed by the CPU 401.

The storage unit 404 stores the respective programs executed by the CPU 401 and it also stores respective DBs (for example, management information DB 121, manuscript DB 122, and scanned manuscript DB 123) used for executing the respective programs by the CPU 401.

The communication unit 405 communicates with the information terminal 130, the image processing apparatus 140 and the information terminals 150-170 through the network 180.

The display unit 406 displays respective information stored in the management server 110. The operational unit 407 is used for inputting instructions to the management server 110.

<3. Manuscript and Manuscript Data>

In the following, in the respective steps until the book is published, the respective types of the manuscript being exchanged between the author 200 and the editor/proofreader 151 and the manuscript data transmitted and received within the image processing system 100 are described.

(1) Original Manuscript and Manuscript Data

Figure 5A:
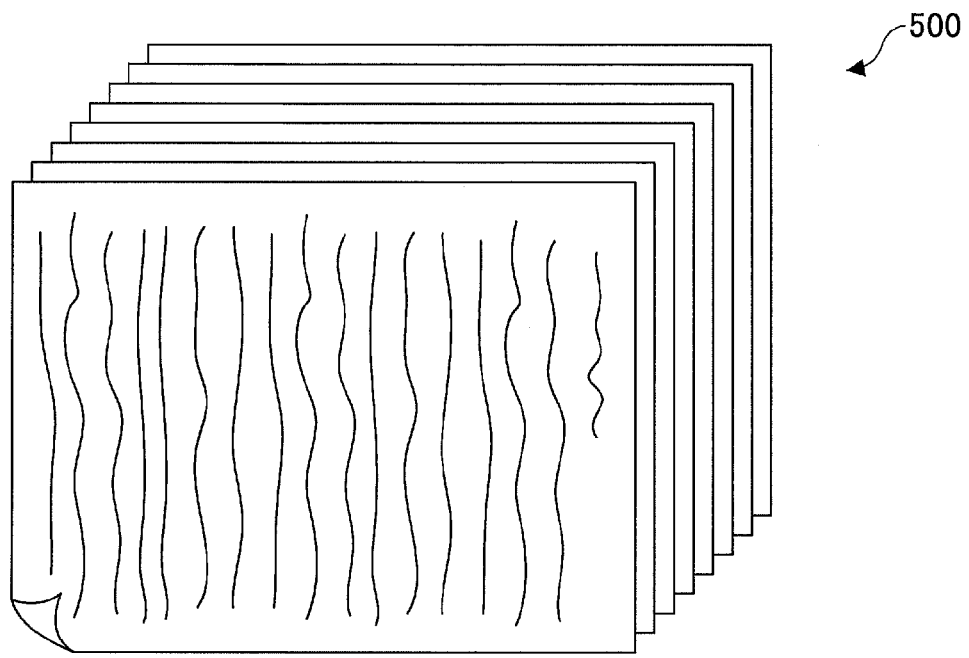
FIG. 5A is a diagram for illustrating an example of an original manuscript.
Figure 5B:
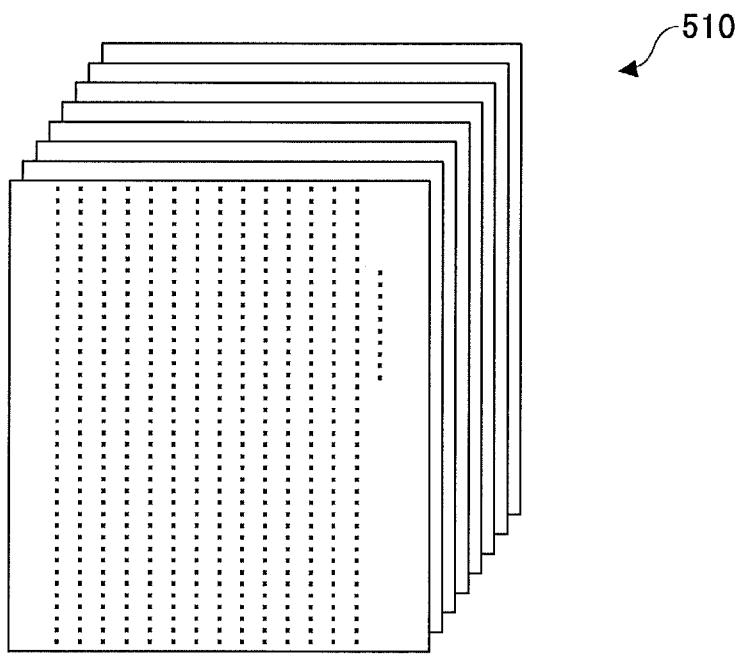
FIG. 5B is a diagram for illustrating an example of manuscript data.

First, the original manuscript and the manuscript data are described. FIG. 5A is a diagram for illustrating an example of the original manuscript. FIG. 5B is a diagram for illustrating an example of the manuscript data. As shown in FIG. 5A, the original manuscript 500 drafted by the author 200 is a hand-written manuscript of papers such as manuscript paper. Meanwhile, as shown in FIG. 5B, the manuscript data 510 generated through digitizing by the operator 131 is a document data in which a number of characters in every page, a character font, etc., are unified. The manuscript data 510 is generated based on the original manuscript 500, and then, it is successively corrected by the operator 131 in the respective proofreading steps based on the proofread manuscript.

(2) Proofreading Paper Format

Figure 6:
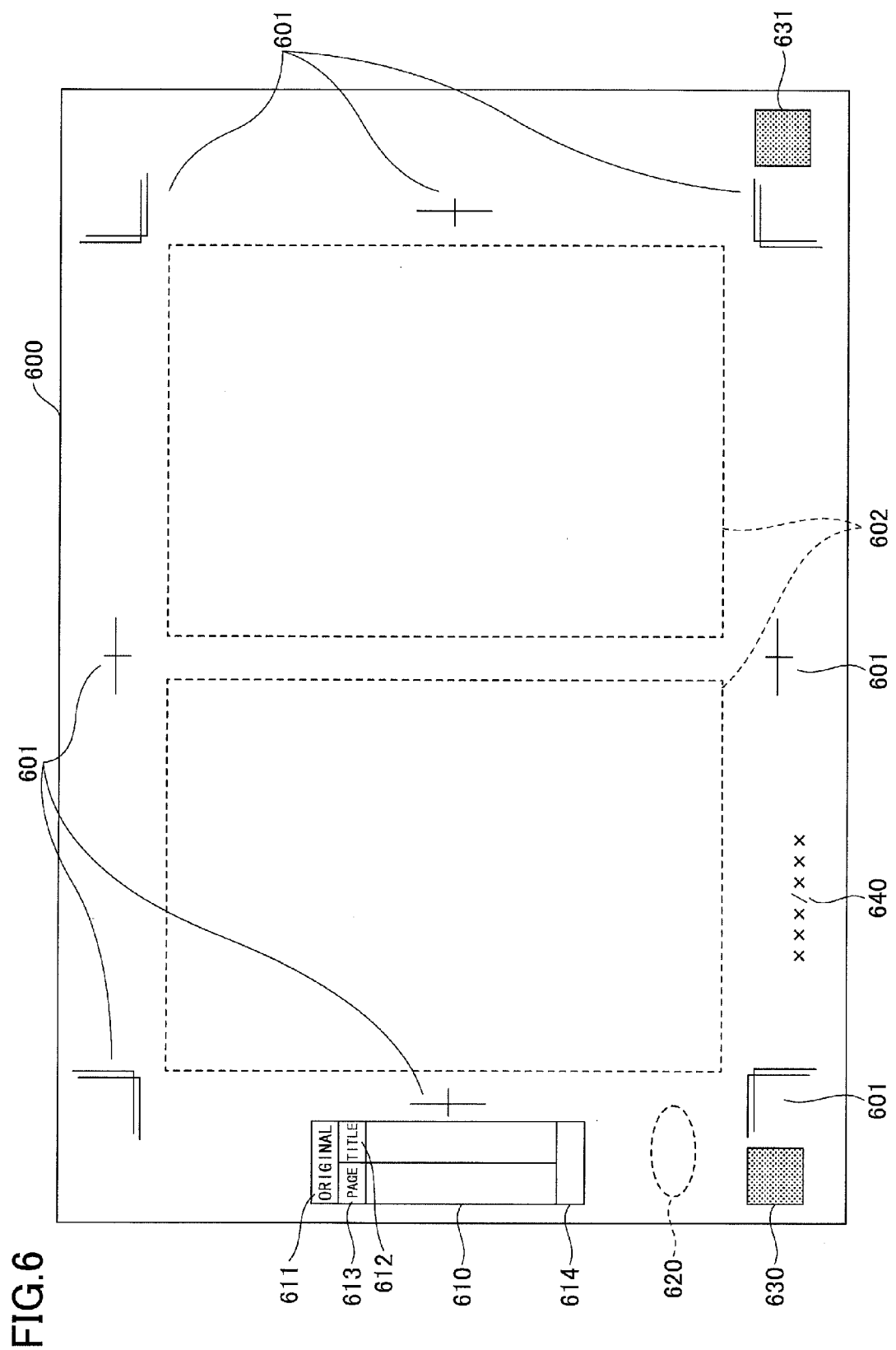
FIG. 6 is a diagram for illustrating an example proofreading paper format.

In the following, a format of paper for proofreading (proofreading paper format) used when generating the manuscript data for proofreading will be described. As described below, the manuscript data for proofreading includes a cover sheet data and sheet data in which the respective pages of the manuscript data are incorporated in the proofreading paper format. Additionally, here, the proofreading paper format in which the respective pages of the manuscript data are incorporated will be described. FIG. 6 is a diagram for illustrating an example proofreading paper format.

As shown in FIG. 6, in the proofreading paper format 600, register marks 601 are disposed so that two pages of the manuscript data are incorporated in every sheet. The register marks are disposed at top/bottom, center of right/left, four corners of layout papers, etc., used for cutting papers into finished size or for performing print register in multi-color printing.

The proofreading paper format 600 further includes incorporation areas 602 for incorporating the respective pages of the manuscript data. Also, a management information display area 610, a check mark entry area 620, a two-dimensional codes 630 and 631 such as QR (Quick Response) codes and a pagination mark 640 are arranged outside the incorporation areas 602.

In the management information display area 610, the management information stored in the management information DB 121 or information based on the management information is entered. For example, in a case where the manuscript data for proofreading is used in the proofreading step (first), the manuscript data generated by digitizing the original manuscript 500 is incorporated in the incorporation area 602, and "original" indicating the original manuscript 500 is entered in a manuscript identification field 611. Also, in a case where the manuscript data for proofreading is used in the proofreading step (second), the manuscript data digitized based on the first proofread manuscript is incorporated in the incorporation area 602. Therefore, "second" indicating the second manuscript on which the first proofreading has been performed is entered in the manuscript identification field 611.

Also, a title of the book is entered in a title entry field 612 of the management information display area 610, and a range of pages indicating from which page to which page in the book are allocated to the page of the incorporated manuscript data is entered in a page allocation entry field 613. Additionally, the respective pages of the manuscript data correspond to respective pages of the published book.

Further, a name of the publishing company which publishes the book is entered in a publishing company field 614 of the management information display area 610.

A check mark indicating that the manuscript data for proofreading has been printed out and proofread by the editor/proofreader 151 is entered in the check mark entry area 620. According to the check mark entry area 620, the operator 131 can easily determine whether the sheet has been proofread by determining whether the check mark is entered.

The two-dimensional codes 630 and 631 are identification information (for example, QR codes) unique to the sheet used for determining properness of the respective pages. Specifically, the two-dimensional codes 630 and 631 includes a "book code" for indicating a book corresponding to the respective pages of the manuscript data for proofreading and a "step code" indicating the step in which the manuscript data for proofreading is printed out. Also, the two-dimensional codes 630 and 631 includes "sheet number" indicating the sheet number of the respective pages of the manuscript data for proofreading and "total number of sheets" indicating total number of sheets of the manuscript data for proofreading.

Therefore, the two-dimensional codes 630 and 631 contain different information on a sheet-by-sheet basis. However, the two-dimensional codes 630 and 631 contain the same information within a sheet. Also, the two-dimensional codes 630 and 631 are disposed at discrete two positions in the same sheet.

The two-dimensional codes 630 and 631 containing the same information are disposed at discrete two positions in the same sheet so as to prevent (or to reduce) erroneous reading of the two-dimensional codes. As described above, the manuscript data for proofreading is printed out to be proofread, then, it is sent to the author 200 as the proofread manuscript to be approved by the author 200. The approved proofread manuscript is sent back to the editor/proofreader 151 and it is scanned to generate the scanning data. Therefore, at a timing when the scanning data is generated, the proofread manuscript may be dirtied or may be folded. Meanwhile, when the two-dimensional codes 630 and 631 containing the same information are disposed at discrete two positions in the same sheet, even though one of the two-dimensional codes is erroneously read, the other one may be successfully read. That is, erroneous reading of the two-dimensional codes can be prevented (or reduced).

Therefore, the positions at which the two-dimensional codes are disposed are not limited to two but they may be three or more. Also, the positions at which the two-dimensional codes are disposed are not limited to right bottom and left bottom of the sheet but they may be other positions.

The pagination mark 640 includes the total number of sheets of the manuscript data for proofreading and the sheet number indicating sequence (at what place the sheet exists from the head of the manuscript data for proofreading) of the respective sheets.

(3) Manuscript Data for Proofreading

Figure 7:
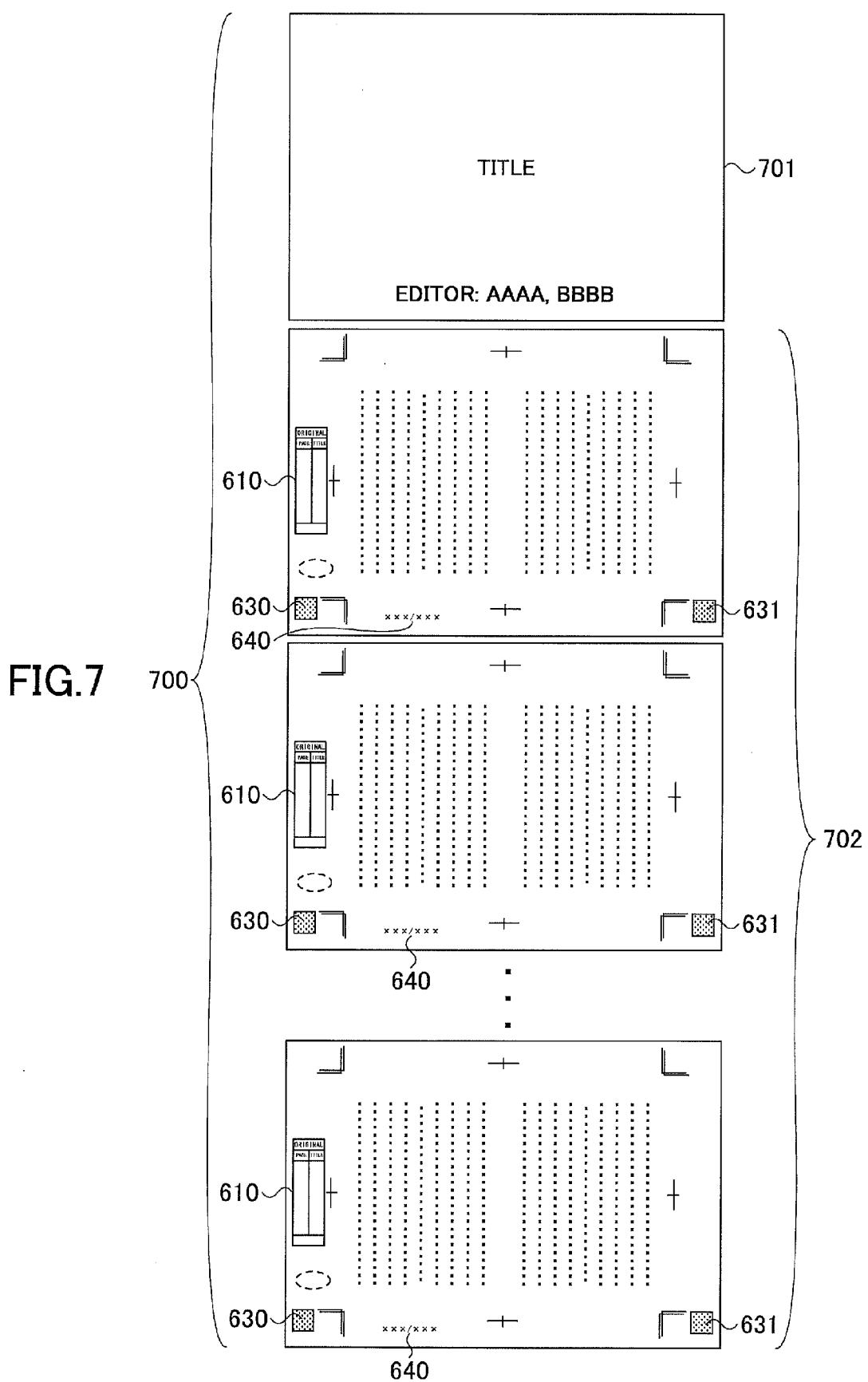
FIG. 7 is a diagram for illustrating an example of manuscript data for proofreading.

In the following, the manuscript data for proofreading will be described. FIG. 7 is a diagram for illustrating an example of the manuscript data for proofreading. As shown in FIG. 7, the manuscript data for proofreading 700 includes a cover sheet data 701 and sheet data 702 in which the respective pages of the manuscript data are incorporated in the proofreading paper format.

The title of the book and the name of the editor/proofreader 151 are entered in a cover sheet of the cover sheet data 701. In the management information display area 610 included in respective sheets of the sheet data 702, the management information common to the respective sheets is entered. Also, the two-dimensional codes 630 and 631 and pagination mark 640 both containing different information on a sheet-by-sheet basis are entered in the respective sheets of the sheet data 702.

(4) Proofread Manuscript

Figure 8:
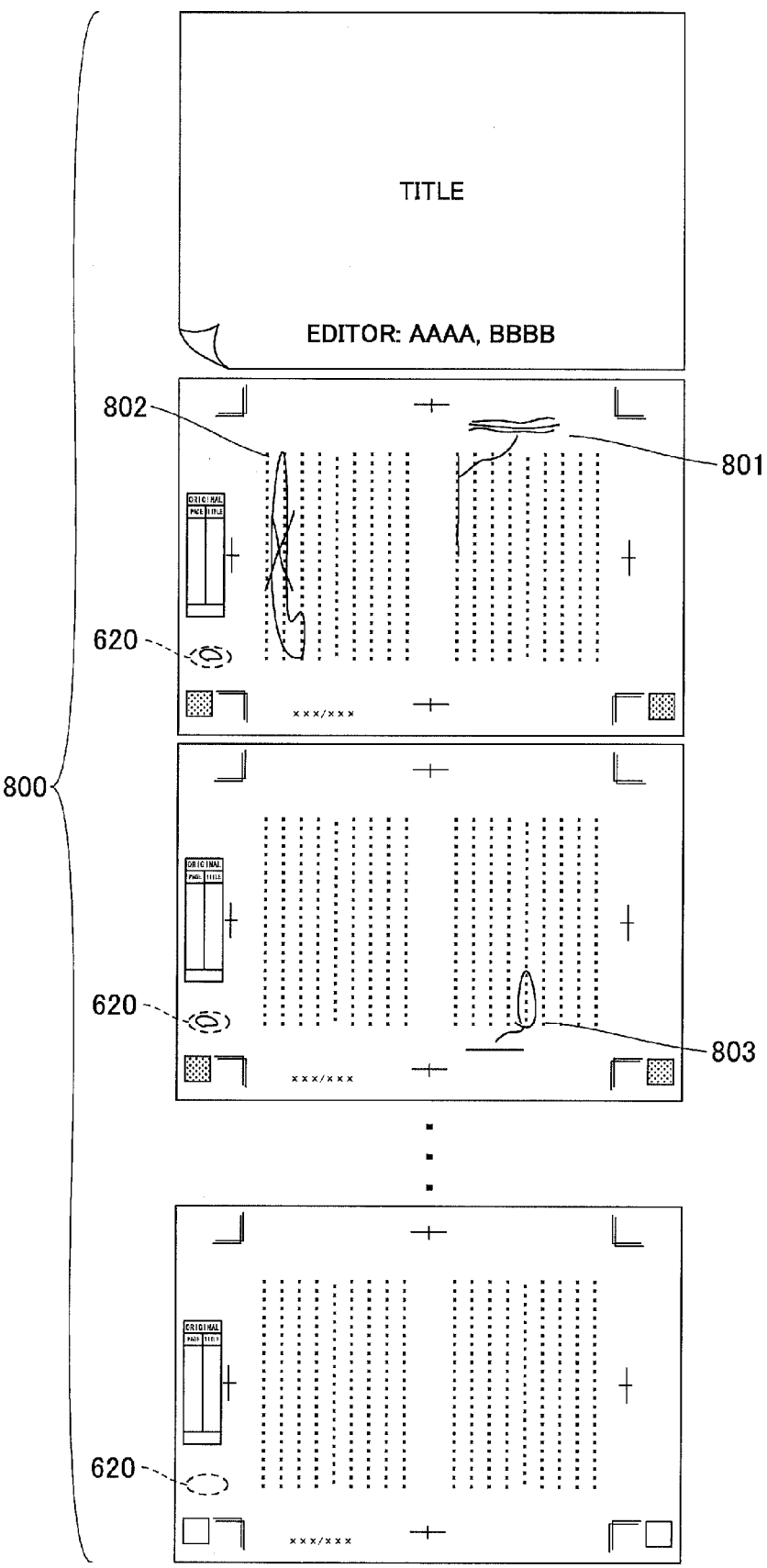
FIG. 8 is a diagram for illustrating an example of the proofread manuscript.

In the following, the proofread manuscript, which is printed by printing out the manuscript data for proofreading and having been proofread by the editor/proofreader 151, will be described. FIG. 8 is a diagram for illustrating an example of the proofread manuscript 800. As shown in FIG. 8, the editor/proofreader 151 prints out the manuscript data for proofreading on a paper media, etc., thereby proofreading it by handwriting. Handwriting spots 801-803 indicate handwriting given by the editor/proofreader 151. Upon proofreading by the handwriting, the editor/proofreader 151 enters the check mark in the check entry mark area 620 of the sheet. Additionally, the editor/proofreader does not enter the check mark in the check entry mark area 620 of a sheet which has not been proofread yet.

<4. Information Stored in DBs>

In the following, information stored in the respective DBs (management information DB 121, manuscript DB 122, and scanned manuscript DB 123) will be described.

(1) Management Information

First, the management information stored in the management information DB 121 will be described. FIG. 9 is a diagram for illustrating an example of the management information 900. As shown in FIG. 9, the management information 900 includes "book code", "title", "author", "editor/proofreader", "notification parties", "step", "date" and "step code" as items of the management information 900. Further, "scanning data", "manuscript data", "proofreading paper ID", "manuscript data for proofreading" and "proofreading finish" are included as the items of the management information 900.

A code for identifying a book is recorded as "book code". A tile of the book is recorded as the "title". The name of the author 200 is recorded as "author". The name and ID (Identification) of the editor/proofreader 151, who is in charge of a series of works performed in the respective steps until the book is published, is recorded as "editor/proofreader". Names and IDs of parties (for example, editor/proofreader 151, his/her supervisors 161 and 171, operator 131, etc.), to whom update of the management information 900 in the respective steps until the book is published is to be notified, are recorded as "notification parties".

The name of the step of the respective steps is recorded as "step". In the example shown in FIG. 9, the proofreading is finished through an original manuscript step, the proofreading step (first), the proofreading step (second), and the finishing step. Date of recording the step is recorded as "date". Code unique to the step is recorded as "step code".

A File name of the scanning data generated through the scanning process performed on the manuscript and storage address thereof are recorded as "scanning data". In the example shown in FIG. 9, in the original manuscript step, the scanning data, whose file name is "pdf1s", is stored as the scanning data generated through scanning process performed on the original manuscript. Also, in the proofreading step (first), the scanning data, whose file name is "pdf2s", is stored as the scanning data generated through scanning process performed on the proofread manuscript. Further, in the proofreading step (second), the scanning data, whose file name is "pdf3s", is stored as the scanning data generated through scanning process performed on the proofread manuscript.

A file name of the manuscript data generated through digitizing the manuscript based on the scanning data and a storage address thereof are recorded as "manuscript data". In the example shown in FIG. 9, in the original manuscript step, the manuscript data, whose file name is "pdf1d", is stored as the manuscript data obtained through digitizing the original manuscript based on the scanning data generated through the scanning process performed on the original manuscript.

Also, in the proofreading step (first), the manuscript data, whose file name is "pdf2d", is stored as the manuscript data, which is updated with the proofreading result of the proofread manuscript, obtained based on the scanning data generated through the scanning process performed on the proofread manuscript.

Further, in the proofreading step (second), the manuscript data, whose file name is "pdf3d", is stored as the manuscript data, which is updated with the proofreading result of the proofread manuscript, obtained based on the scanning data generated through the scanning process performed on the proofread manuscript.

Additionally, in the example of FIG. 9, the manuscript data generated in the proofreading step (second) (file name: "pdf3d") is used for bookbinding in the publishing work. Therefore, a file name "pdf_final" of the manuscript data is recorded by setting the manuscript data whose name is "pdf3d" to be read-only data and storing it in a certain storage area, as "manuscript data" corresponding to the finishing step.

The ID for identifying proofreading paper format 600 is recorded as "proofreading paper ID". Additionally, the proofreading paper format can be selected by the editor/proofreader 151 from a plurality of formats prepared in advance including the proofreading paper format 600 shown in FIG. 6. Therefore, an ID for identifying the proofreading paper format selected by the editor/proofreader 151 is recorded as "proofreading paper ID".

A file name of the manuscript data for proofreading and a storage address thereof are recorded as "manuscript data for proofreading". In the example shown in FIG. 9, a file name "pdf1p" of the manuscript data for proofreading, generated by incorporating the manuscript data whose file name is "pdf1d" in the proofread paper format 600, is recorded associated with the file name "pdf1d". Additionally, the manuscript data for proofreading whose file name is "pdf1p" is generated in the printing process, after the proofreading step (first) is started and the step code of the proofreading step (first) (that is, step code of the step currently performed) is recorded in the management information 900.

Also, a file name "pdf2p" of the manuscript data for proofreading, generated by incorporating the manuscript data whose file name is "pdf2d" in the proofread paper format 600, is recorded as "manuscript data for proofreading" associated with the file name "pdf2d". Additionally, the manuscript data for proofreading whose file name is "pdf2p" is generated in the printing process, after the proofreading step (second) is started and the step code of the proofreading step (second) (that is, step code of the step currently performed) is recorded as "manuscript data for proofreading" in the management information 900.

Further, a file name "pdf3p" of the manuscript data for approval, generated by incorporating the manuscript data whose file name is "pdf3d" in the proofread paper format 600, is recorded as "manuscript data for proofreading" associated with the file name "pdf3d". Additionally, the manuscript data for approval whose file name is "pdf3p" is generated in the printing process, after the finishing step is started and the step code of the finishing step (that is, step code of the step currently performed) is recorded in the management information 900.

When the editor/proofreader 151 receives the approved manuscript from the author 200 and the information terminal 150 transmits the proofreading finish information indicating that the proofreading is completed, "✓" indicating the proofreading finish is recorded as "proofreading finish".

Figure 10:
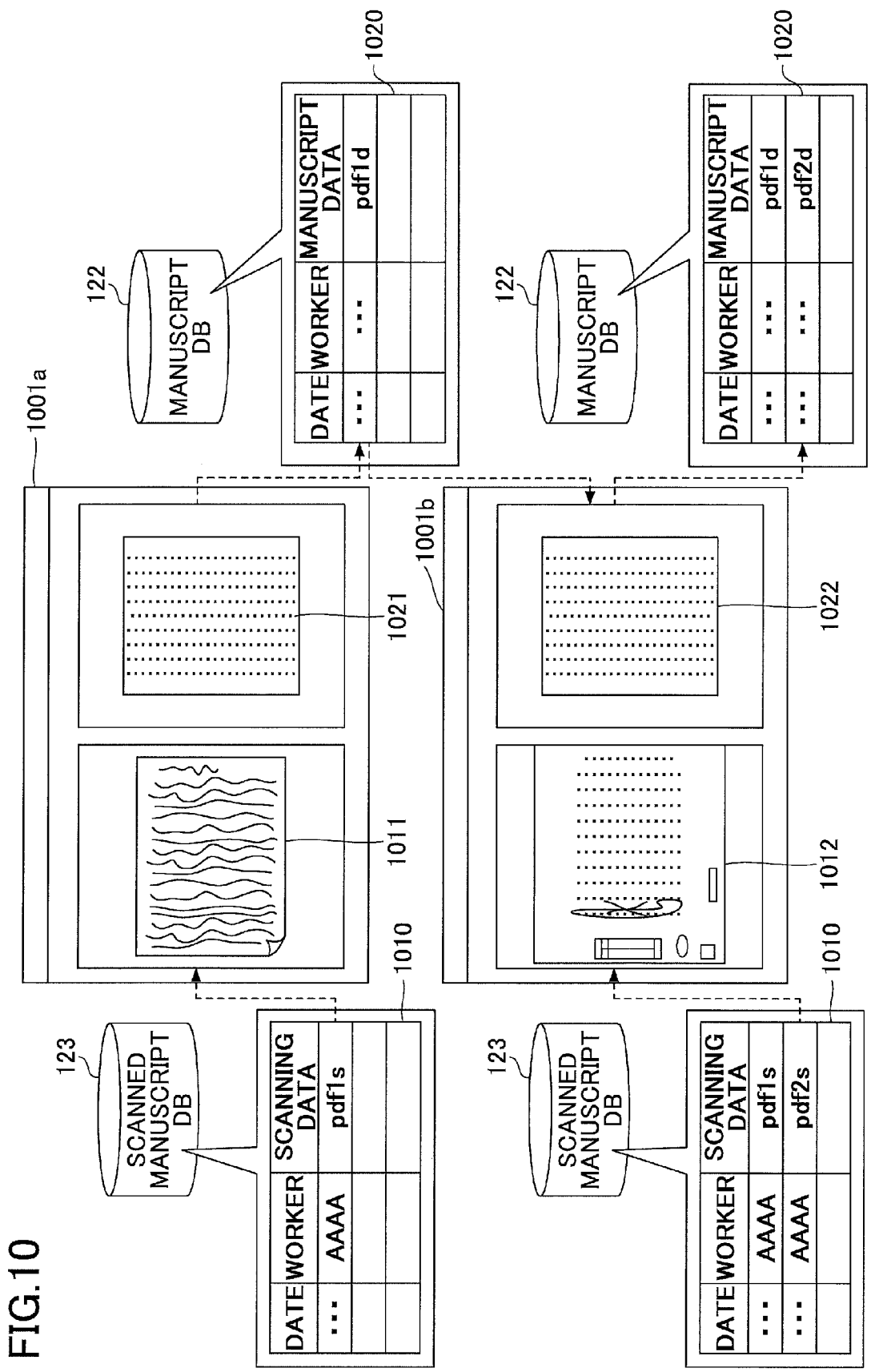
FIG. 10 is a diagram for illustrating manuscript information and scanned manuscript information.

(2) Manuscript Information and Scanned Manuscript Information In the following, manuscript information stored in the manuscript DB 122 and scanned manuscript information stored in the scanned manuscript DB 123 will be described. FIG. 10 is a diagram for illustrating the manuscript information 1020 and the scanned manuscript information 1010.

In FIG. 10, the display screen 1001a and 1001b are example screens displayed in the information terminal 130 when the operator 131 digitize the respective manuscripts based on the scanning data by using the information terminal 130.

In FIG. 10, the scanning data 1011 generated by performing the scanning process on the original manuscript and the scanning data 1021 obtained by digitizing the original manuscript based on the scanning data 1011 are shown in the display screen 1001a.

Also, in FIG. 10, the scanning data 1012 generated in the proofreading step (first) by performing the scanning process on the proofread manuscript and the scanning data 1022 obtained by digitizing the proofread manuscript based on the scanning data 1012 are shown in the display screen 1001b.

In the case of the display screen 1001a, the scanned manuscript information 1010 for managing scanning data 1011 and the scanning data 1011 whose file name is "pdf1s" are stored in the scanned manuscript DB 123. The scanned manuscript information 1010 includes "date", "worker" and "scanning data" as the items of the scanned manuscript information.

A date of the scanning work by the editor/proofreader 151 is recorded as "date". The name or ID of the editor/proofreader 151 who has performed the scanning work is recorded as "worker". A file name of the scanning data 1011 generated by the scanning work is recorded as "scanning data".

In the display screen 1001a, the scanning data whose file name has been selected by the operator 131 is displayed. In the case of the display screen 1001a, the scanning data whose file name is "pdf1s" is selected by the operator 131 to be displayed.

Also, in case of the display screen 1001a, the manuscript information 1020 for managing the manuscript data 1021 and the manuscript data 1021 whose file name is "pdf1d" are stored in the manuscript DB 122.

The manuscript information 1020 includes "date", "worker" and "manuscript data" as items of the manuscript information. Date of digitizing process by the operator 131 is recorded as "date". The name or ID of the operator 131 who performs digitizing process is recorded as "worker".

The file name of the manuscript data 1021 generated through the digitizing process is recorded as "manuscript data".

Similarly, in the case of the display screen 1001*b*, the scanned manuscript information 1010, the scanning data 1011 whose file name is "pdf1s" and the scanning data 1012 whose file name is "pdf2s" are stored in the scanned manuscript DB 123. In the display screen 1001*b*, the scanning data whose file name has been selected from the scanned manuscript information 1010 by the operator 131 is displayed. In the case of the display screen 1001*b*, the scanning data 1012 whose file name is "pdf2s" is selected by the operator 131 to be displayed.

Also, in case of the display screen 1001*b*, the manuscript data 1021 whose file name is "pdf1d" and the manuscript data 1022 whose file name is "pdf2d" are stored in the manuscript DB 122. Further, the manuscript information 1020 for managing the manuscript data is stored in the manuscript DB 122. Additionally, the manuscript data 1022 is generated through an operation in which the operator 131 corrects the manuscript data 1021 based on the scanning data 1012.

<5. Functional Configuration of Management Server>

Figure 11:
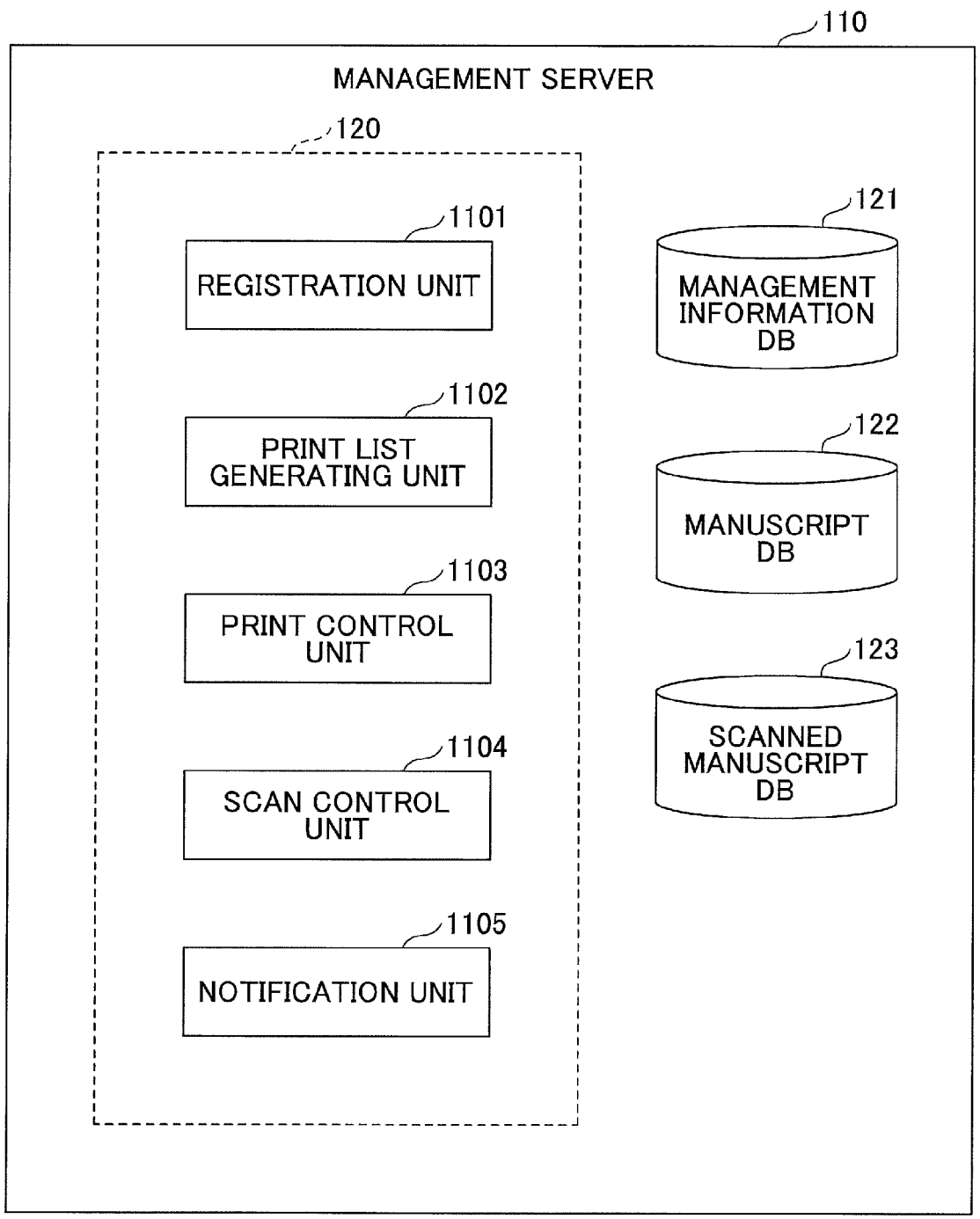
FIG. 11 is a block diagram for illustrating a functional configuration of a management server.

In the following, functions achieved by executing the management program 120 of the management server 110 with the CPU 401 will be described. FIG. 11 is a block diagram for illustrating a functional configuration of the management server 110.

As shown in FIG. 11, functions achieved by executing the management program 120 with the CPU 401 includes a registration unit 1101, a print list generating unit 1102, a print control unit 1103, a scan control unit 1104 and a notification unit 1105.

The registration unit 1101 records respective information in the management information 900, and thereby serves as a management means for managing the manuscript in the respective steps. Specifically, the registration unit 1101 records registration information reported from the information terminal 130 or the information terminal 150 in the management information 900 stored in the management information DB 121. Also, the registration unit 1101 records print information (storage address and file name of the manuscript data for proofreading) reported from the print control unit 1103 in the management information 900 stored in the management information DB 121.

The print list generating unit 1102 transmits list information to the image processing apparatus 140 in response to request for the list (list request) from the image processing apparatus 140. Specifically, the print list generating unit 1102 searches for the management information DB 121 with the ID of the editor/proofreader 151 included in the list request, and thereby extracts the management information items in which the ID recorded as "editor/proofreader" is the same as the ID included in the list request. Also, the print list generating unit 1102 transmits the file names of the manuscript data recorded as "manuscript data" of the respective extracted management information items to the image processing apparatus 140 as the list information.

In response to receiving a request for print (print request) including the file name of the manuscript data from the image processing apparatus 140, the print control unit 1103 generates the cover sheet with reference to the management information 900 in which the file name of the manuscript data is recorded. Also, the print control unit 1103 retrieves the manuscript data to incorporate the respective pages of it in the proofreading paper format 600. Further, the print control unit 1103 enters the management information in the management information display area 610 of the respective sheets with reference to the management information 900, and also enters the two-dimensional codes 630 and 631 and the pagination mark 640. Also, the print control unit 1103 outputs data of the generated cover sheet and the respective sheets to the image processing apparatus 140 as the manuscript data for proofreading.

Further, the print control unit 1103 stores the generated manuscript data for proofreading in a certain storage area while it reports the print information (storage address and file name of manuscript data for proofreading) to the registration unit 1101.

The scan control unit 1104 receives the scanning data generated by scanning process performed in the image processing apparatus 140 to store it in the scanned manuscript DB 123. Also, the scan control unit 1104 records the file name of the received scanning data, the date of the scanning process and the name or ID of the worker who has performed the scanning process.

Also, the scan control unit 1104 determines presence or absence of work mistakes based on the received scanning data. Specifically, the scan control unit 1104 analyzes the two-dimensional codes 630 and 631 attached to the respective sheets in the scanning data to determine whether a sheet of different book code or a different step code is included and whether a sheet missing occurs.

Further, in a case where the presence of the work mistake is determined through the determination based on the scanning data, the scan control unit 1104 reports the work mistake (error information) to the notification unit 1105.

Upon the registration unit 1101 updating the management information 900 stored in the management information DB 121, the notification unit 1105 transmits the updated content to the parties recorded as "notification parties". Also, the notification unit 1105 reports the error information to the parties in response to the error information reported from the scan control unit 1104.

<6. Flow of Process Performed in Management Server>

In the following, respective parts of a management process (see FIG. 2 and FIG. 3) performed by the management server 110 will be described in detail.

(1) Flow of Registration Process by Registration Unit

Figure 12:
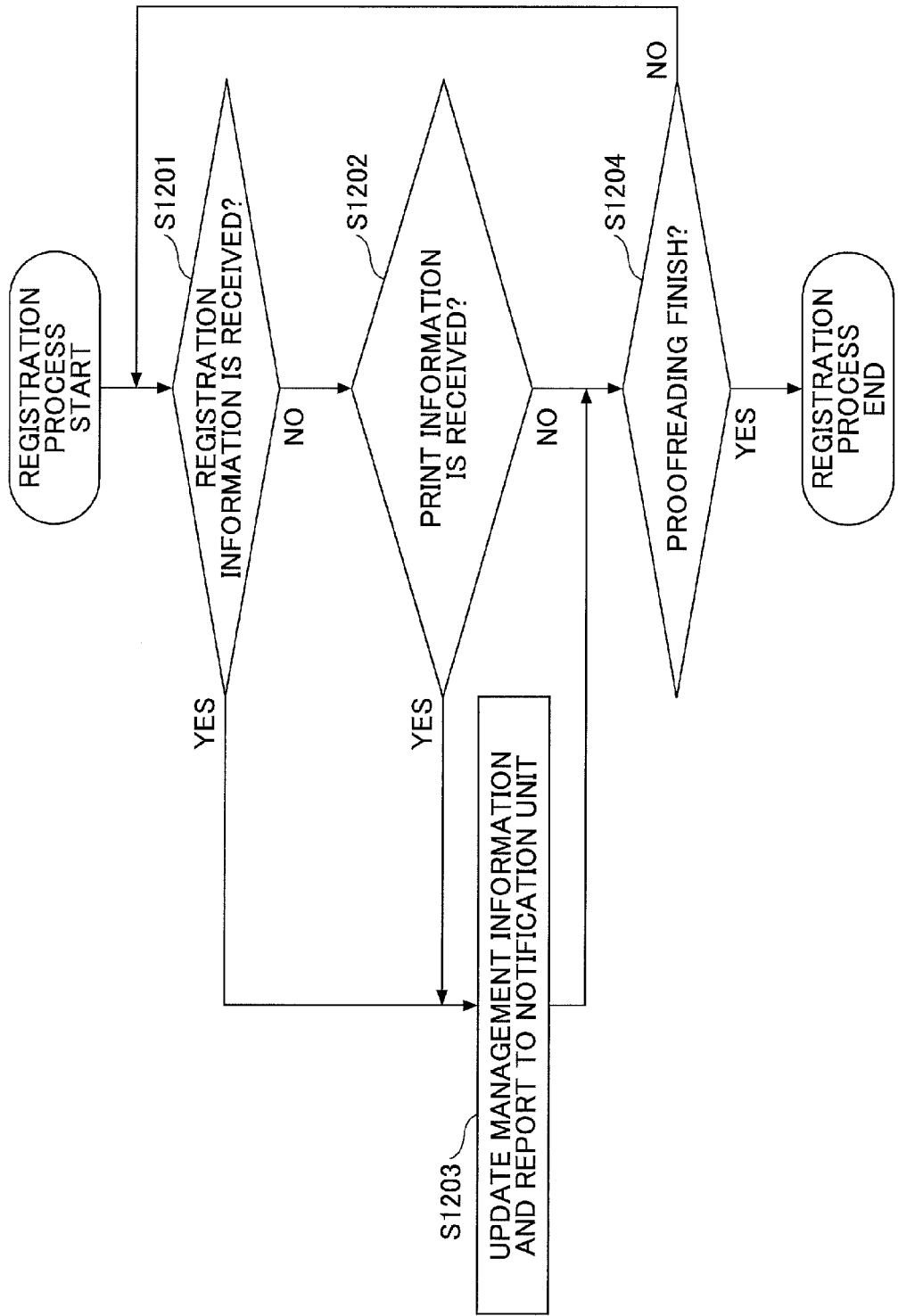
FIG. 12 is a flowchart for illustrating a registration process.

First, the registration process performed by the registration unit 1101 will be described. FIG. 12 is a flowchart for illustrating the registration process performed by the registration unit 1101.

In step S1201, the registration unit 1101 determines whether the registration information is received. In a case where the registration information is determined to be received in step S1201, the process is proceeded to step S1203, and the management information 900 is updated with the received management information. Also, the update of the management information 900 and the updated content are reported to the notification unit 1105. Additionally, cases described as follows are exemplified as the case where the registration unit 1101 receives the registration information.

A case where the registration information about "book code", "title", "editor/proofreader", "notification parties", "step", "date", "scanning data" and "proofreading paper ID" of the management information 900 is received from the information terminal 150 in the original manuscript step (step S206 shown in FIG. 2).

A case where the registration information about "manuscript data" of the management information 900 is received from the information terminal 130 in the original manuscript step (step S210 shown in FIG. 2).

A case where the registration information about "step", "date", and "step code" of the management information 900 is received form the information terminal 150 in the proofreading step (first), the proofreading step (second) or the finishing step (step S211 shown in FIG. 2, steps S301 or S316 shown in FIG. 3).

A case where the registration information about "scanning data" of the management information 900 is received from the information terminal 150 in the proofreading step (first) or the proofreading step (second) (step S221 shown in FIG. 2 or step S311 shown in FIG. 3).

A case where the registration information about "manuscript data" of the management information 900 is received from the information terminal 130 in proofreading step (first) or the proofreading step (second) (step S225 shown in FIG. 2 or step S315 shown in FIG. 3).

A case where the registration information about "proofreading finish" of the management information 900 is received from the information terminal 150 in the finishing step (step S323 shown in FIG. 3).

On the other hand, in a case where the registration information is determined not to be received in step S1201, the process is proceeded to step S1202. In step S1202, the registration unit 1101 determines whether the print information is received from the print control unit 1103. In a case where the print information is determined to be received in step S1202, the process is proceeded to step S1203, and the management information 900 is updated with the received print information. Also, the update of the management information 900 is reported to the notification unit 1105. A case described as follows is exemplified as the case where the registration unit 1101 receives the print information.

A case where the print information about "manuscript data for proofreading" of the management information 900 is received from the print control unit 1103 in the proofreading step (first), the proofreading step (second) or the finishing step (step S213 shown in FIG. 2, step S303 or S318 shown in FIG. 3).

On the other hand, in a case where the print information is determined not to be received in step S1202, the process is proceeded to step S1204. In step S1204, the registration unit 1101 determines whether "✓" indicating the proofreading finish is recorded as "proofreading finish" of the management information 900. In a case where it is determined that "✓" indicating the proofreading finish is not recorded in step S1204, the process is returned to step S1201. On the other hand, in a case where it is determined that "✓" indicating the proofreading finish is recorded in step S1204, the registration process of the registration information 900 is finished.

(2) List Information Provision Process by Print List Generating Unit

Figure 13:
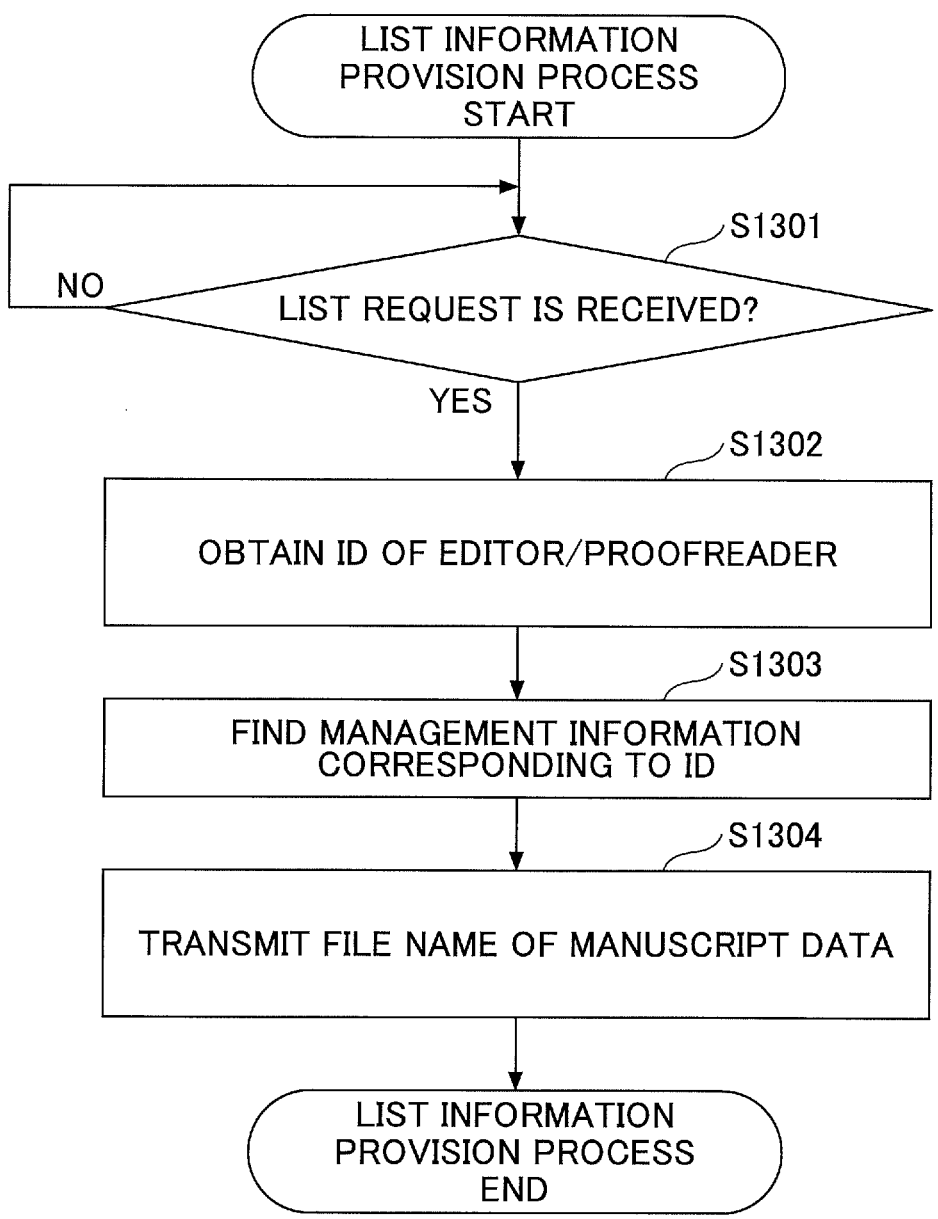
FIG. 13 is a flowchart for illustrating a list information provision process.

In the following, a list information provision process performed by the print list generating unit 1102 will be described. FIG. 13 is a flowchart for illustrating the list information provision process performed by the print list generating unit 1102.

In step S1301, the print list generating unit 1102 determines whether the list request is received form the image processing apparatus 140. In a case where the list request is determined not to be received in step S1301, the print list generating unit 1102 waits until it is received.

On the other hand, in a case where the list request is determined to be received in step S1301, the process is proceeded to step S1302. In step S1302, the print list generating unit 1102 extracts information about workers (ID of the editor/proofreader 151 who has logged in the image processing apparatus 140 in order to perform the printing work) included in the list request.

In step S1303, the print list generating unit 1102 searches for the management information DB 121 to find the management information in which the ID same as the ID extracted in step S1302 is recorded as "editor/proofreader".

In step S1304, the print list generating unit 1102 transmits the file name recorded as "manuscript data" of the respective management information items found through the search in step S1303 to the image processing apparatus 140 as the list information.

(3) Print Control Process by Print Control Unit

Figure 14:
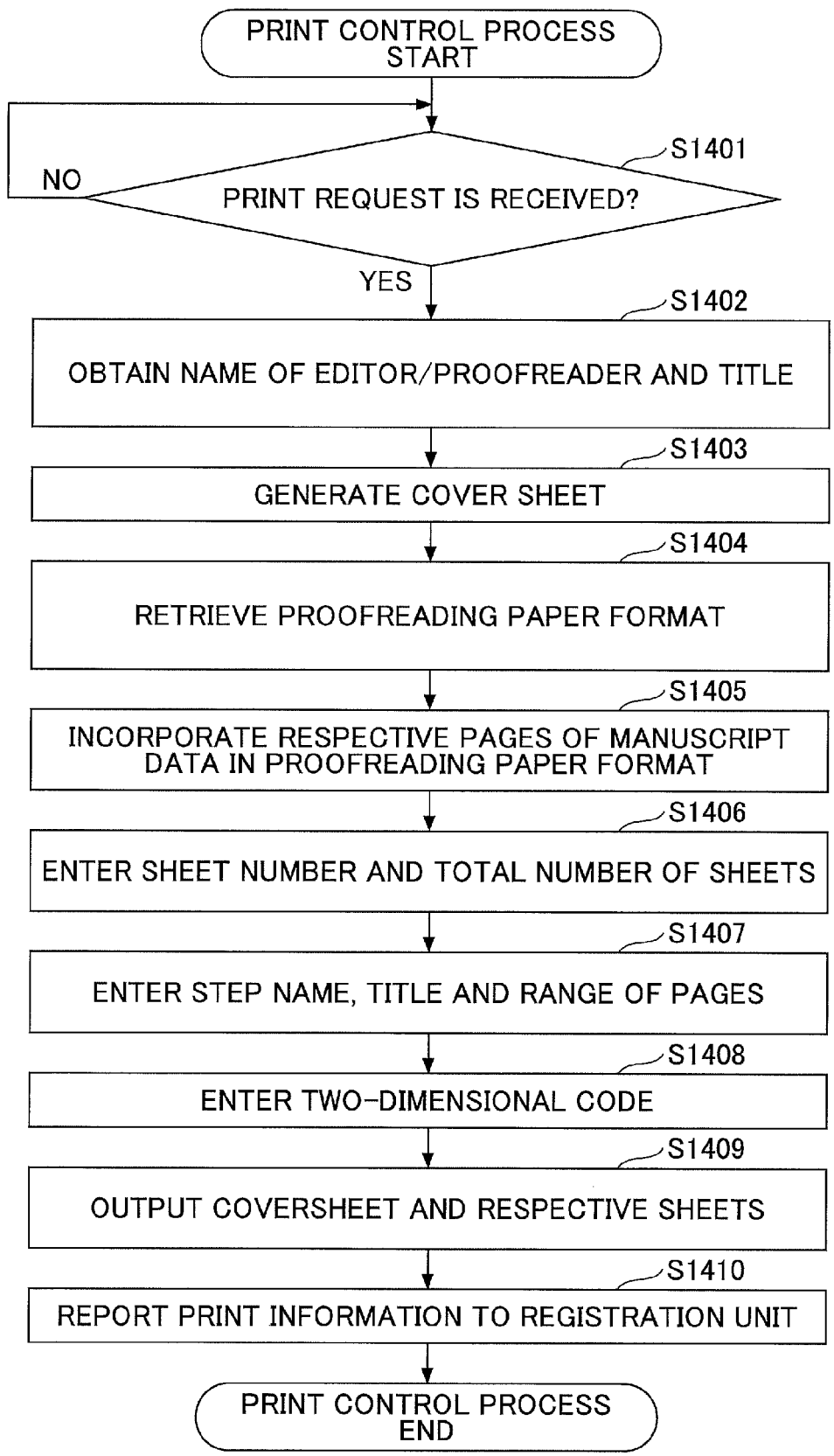
FIG. 14 is a flowchart for illustrating a print control process.

In the following, a print control process performed by the print control unit 1103 will be described. FIG. 14 is a flowchart for illustrating the print control process performed by the print control unit 1103.

In step S1401, the print control unit 1103 determines whether the print request including the file name of the manuscript data to be printed is received form the image processing apparatus 140. In a case where the print request is determined not to be received in step S1401, the print control unit 1103 waits until it is received. On the other hand, in a case where the print request is determined to be received in step S1401, the process is proceeded to step S1402.

In step S1402, the print control unit 1103 extracts the file name of the manuscript data to be printed from the print request. Also, the print control unit 1103 retrieves the title and the name of the editor/proofreader recorded, associated with the extracted file name, as "title" and "editor/proofreader" of the management information 900.

In step S1403, the print control unit 1103 generates the cover sheet of the manuscript data for proofreading by using the title and the name of the editor/proofreader retrieved in step S1402.

In step S1404, the print control unit 1103 retrieves proofreading paper format 600 based on the proofreading paper ID recorded, associated with the extracted file name, as "proofreading paper ID" of the management information 900.

In step S1405, the print control unit 1103 retrieves the manuscript data corresponding to the extracted file name from the manuscript DB 122 and incorporates the respective pages of the retrieved manuscript data for proofreading in the proofreading paper format 600 retrieved in step S1404, thereby generating the respective sheets. Also, the print control unit 1103 counts number of the sheets when incorporating the respective pages of the manuscript data in the proofreading paper format.

In step S1406, the print control unit 1103 enters the sheet number and the total number of the sheets counted in step S1405 in the pagination mark 640 included in the respective pages of the manuscript data for proofreading.

In step S1407, the print control unit 1103 retrieves the name of step recorded, associated with the extracted file name, as "step" in the management information 900 and the title recorded as "title" in the management information 900. Also, the print control unit 1103 enters the retrieved name of step and title in the manuscript identification field 611 and the title entry field 612 of the management information display area 610. Further, the print control unit 1103 enters the range of pages in the book to which the respective incorporated pages of the manuscript data are allocated in the page allocation entry field 613.

In step S1408, the print control unit 1103 retrieves the book code and the step code recorded, associated with the extracted file name, as "book code" and "step code" in the management information 900. Also, the print control unit 1103 generates the two-dimensional codes based on the retrieved book code and step code and the sheet number and total number of the sheets, and thereby enters the two-dimensional codes in the respective sheets.

In step S1409, the print control unit 1103 outputs the cover sheet generated in step S1403 and the respective sheets generated in the steps from S1404 to S1408 to the image processing apparatus 140 as the manuscript data for proofreading. Also, the print control unit 1103 stores the manuscript data for proofreading in a certain storage area in the management server 110.

In step S1410, the print control unit 1103 reports the print information (file name and storage address of manuscript data for proofreading) to the registration unit 1101.

Additionally, although in the descriptions above, the respective pages of the manuscript data are incorporated in the proofreading paper format 600 in the print control process (that is, at a timing when the manuscript data for proofreading is generated), the respective pages of the manuscript data may be incorporated in the proofreading paper format 600 at a timing different from the timing when the manuscript data for proofreading is generated. That is, the respective pages of the manuscript data may be incorporated in the proofreading paper format 600 at an arbitrary timing from generating the manuscript data to performing the print control process.

(4) Scan Control Process by Scan Control Unit

Figure 15:
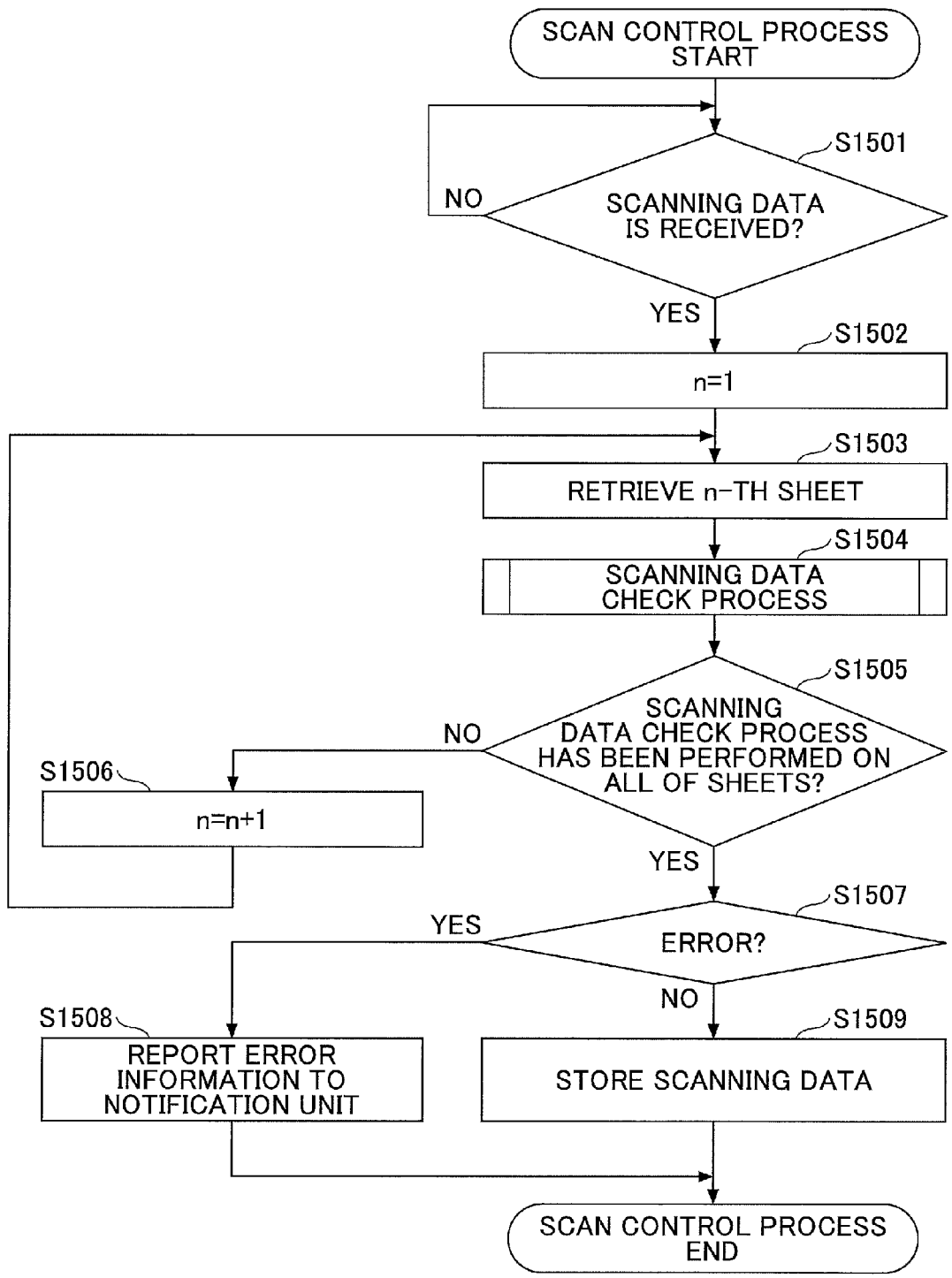
FIG. 15 is a diagram for illustrating an example of a scan control process.

In the following, the scan control process performed by the scan control unit 1104 will be described, where the scan control process is performed on the scanning data generated through the scanning process on the proofread manuscript. FIG. 15 is a diagram for illustrating an example of the scan control process performed by the scan control unit 1104.

In step S1501, the scan control unit 1104 determines whether the scanning data generated through the scanning process on the proofread manuscript is received. In a case where the scanning data generated through the scanning process on the proofread manuscript is determined not to be received in step S1501, the scan control unit 1104 waits until it is received. On the other hand, in a case where the scanning data is determined to be received in step S1501, the process is proceeded to step S1502.

In step S1502, the scan control unit 1104 substitutes an initial value (="1") in a sheet counter "n". In step S1503, the scan control unit 1104 retrieves the n-th sheet datum from the received scanning data.

In step S1504, the scan control unit 1104 performs a scanning data check process for determining properness of the sheet on the n-th sheet datum in the scanning data. Additionally, detailed descriptions of the scanning data check process will be given below with reference to FIG. 16 and FIG. 17.

In step S1505, the scan control unit 1104 determines whether the scanning data check process has been performed on all of the sheet data in the received scanning data. In a case where it is determined that there is a sheet datum on which the scanning data check process has not been performed in step S1505, the process is proceeded to step S1506 to increment the sheet counter "n", then the process is returned to step S1503.

Meanwhile, in a case where it is determined that the scanning data check process has been performed on all of the sheet data in the scanning data, the process is proceeded to step S1507.

In step S1507, the scan control unit 1104 determines whether a sheet datum determined to be improper is included in the received scanning data. In a case where it is determined that a sheet datum determined to be improper is included in step S1507, the process is proceeded to step S1508.

In step S1508, the scan control unit 1104 reports the error information about the sheet datum determined to be improper to the notification unit 1105.

On the other hand, in a case where it is determined that a sheet datum determined to be improper is not included in step S1507, the process is proceeded to step S1509. In step S1509, the scan control unit 1104 stores the received scanning data in the scanned manuscript DB 123. Also, the scan control unit 1104 records the file name of the scanning data, the date of scanning process and the name or ID of the worker who has performed the scanning work.

(5) Scanning Data Check Process by Scan Control Unit

Figure 16:
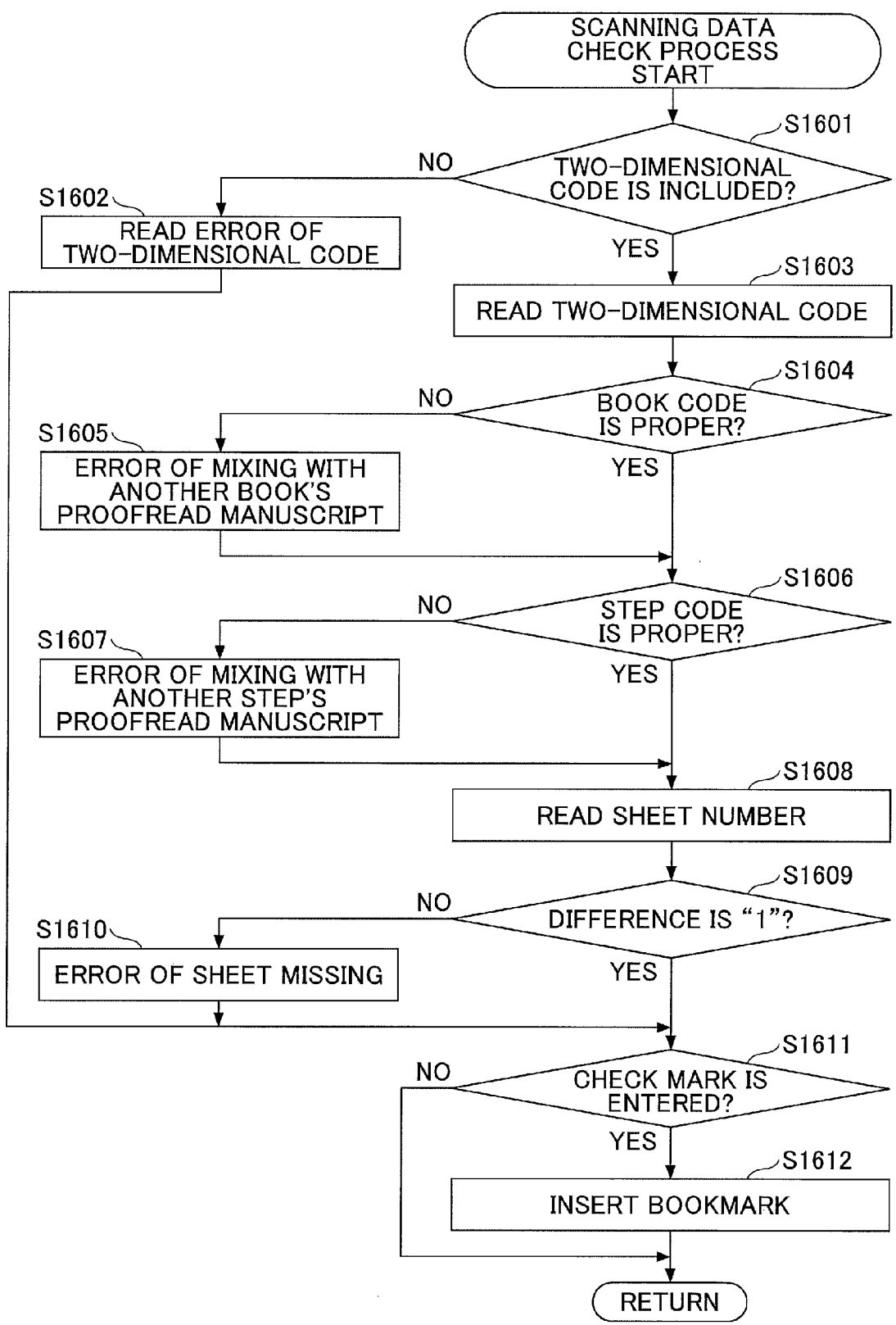
FIG. 16 is a flowchart for illustrating a scanning data check process.

In the following, a scanning data check process (step S1504) performed by the scan control unit 1104 will be described with reference to FIG. 16 and FIG. 17. FIG. 16 is a flowchart for illustrating the scanning data check process performed by the scan control unit 1104. FIG. 17A and FIG. 17B are diagrams for illustrating examples of the two-dimensional code and processing result of the scanning data check process.

As shown in FIG. 16, upon the scanning data check process being started, in step S1601, the scan control unit 1104 determines whether the two-dimensional code is included in the sheet datum of n-th sheet. In a case where the two-dimensional code is determined to be included in step S1601, the process is proceeded to step S1603. On the other hand, in a case where the two-dimensional code is determined not to be included in step S1601, the process is proceeded to step S1602.

In step S1602, the scan control unit 1104 determines that a read error of the two-dimensional code occurs in the sheet datum of the n-th sheet.

In step S1603, the scan control unit 1104 reads the two-dimensional code. FIG. 17A is a diagram for illustrating an example content of the two-dimensional code. As shown in FIG. 17A, the two-dimensional code entered in the respective sheets of the manuscript data for proofreading includes a main code, a step code, "sheet number/total number of sheets".

The main code is composed of twelve alphanumeric characters. The step code is composed of eighteen alphanumeric characters. The sheet number and the total number of sheets are respectively composed of three digits of numbers and "/" is disposed between them. Therefore, the scan control unit 1104 can determine to which book the n-th sheet datum belongs, to which step the n-th sheet datum corresponds, or which sheet number corresponds to the sheet datum by reading the two-dimensional code.

Descriptions are continued to be given with reference to FIG. 16. In step S1604, the scan control unit 1104 determines whether the book code read from the two-dimensional code attached to the n-th sheet datum is proper. Additionally, the scan control unit 1104 determines whether the book code is proper by determining whether the concerned book code is the same as the book codes read from the two-dimensional codes attached to other sheets. For example, in a case where the concerned book code is the same as the majority (for example more than 90%) of the book codes among those read from the two-dimensional codes attached to other sheets, the scan control unit 1104 determines that the concerned book code attached to the n-th sheet of the scanning data is proper. On the other hand, in a case where the concerned book code is not the same as the majority of the book codes, the scan control unit 1104 determines that the concerned book code attached to the n-sheet is improper.

FIG. 17B is a diagram for illustrating example contents of the two-dimensional codes attached to the respective sheets of the scanning data whose total number of sheets is 300. As shown in FIG. 17B, the book codes read from the two-dimensional codes in the majority of the sheets indicate "1234567890AB". Meanwhile, the book code of the 100th sheet indicates "1234567779AA". Therefore, in the example shown in FIG. 17B, the scan control unit 1104 determines the book code to be improper when the scan control unit 1104 performs the determination operation on the sheet datum at "n=100".

In a case where the book code is determined to be proper in step S1604, the process is proceeded to step S1606. On the other hand, in a case where the book code is determined to be improper, the process is proceeded to step S1605. In step S1605, the scan control unit 1104 determines that an error of mixing with another book's proofread manuscript occurs.

In step S1606, the scan control unit 1104 determines whether the step code read from the two-dimensional code attached to the n-th sheet is proper. Additionally, the scan control unit 1104 determines whether the step code is proper by determining whether the concerned step code is the same as the step codes read from the two-dimensional codes attached to other sheets. For example, in a case where the concerned book code is the same as the majority (for example more than 90%) of the step codes among those read from the two-dimensional codes attached to other sheets, the scan control unit 1104 determines that the concerned step code attached to the n-th sheet is proper. On the other hand, in a case where the concerned book code is not the same as the majority of the step codes, the scan control unit 1104 determines that the concerned step code attached to the n-sheet is improper.

As shown in FIG. 17B, the step codes read from the two-dimensional codes in the majority of the sheets indicate "1234567890ABCDEFGH". Meanwhile, the book code of the 180th sheet indicates "1234567890ABC99999". Therefore, in the example shown in FIG. 17B, the scan control unit 1104 determines the step code to be improper when the scan control unit 1104 performs the determination operation on the sheet datum at "n=180".

In a case where the step code is determined to be proper in step S1606, the process is proceeded to step S1608. On the other hand, in a case where the step code is determined to be improper, the process is proceeded to step S1607. In step S1607, the scan control unit 1104 determines that an error of mixing with another step's proofread manuscript occurs.

In step S1608, the scan control unit 1104 finds the sheet number read from the two-dimensional code attached to the n-th sheet. In step S1609, the scan control unit 1104 determines whether a difference between the concerned sheet number and a sheet number read from the two-dimensional code attached to the (n−1)th sheet is "1".

In a case where the difference is determined to be "1", the step is proceeded to step S1611. In a case the difference is determined not to be "1", the step is proceeded to step S1610.

In step S1610, the scan control unit 1104 determines that an error of sheet missing between the (n−1)th sheet and the n-th sheet occurs.

In step S1611, the scan control unit 1104 determines whether the check mark indicating that the manuscript has been proofread is entered in the check mark entry area 620 of the n-th sheet datum.

In a case where it is determined that the check mark is entered in step S1611, a bookmark is inserted in the n-th sheet datum in step S1612. Thus, the operator 131 can easily recognize that the sheet of the n-th sheet datum has been proofread. Additionally, the bookmark is a kind of link and serves as a table of contents.

Additionally, in the descriptions above, although the determination of the error of sheet missing is performed by calculating the difference between the sheet numbers, this is not a limiting example. For example, the determination of the error of sheet missing may be performed by counting up the sheet number to determine whether the sheet number reaches that corresponding to the total number of the pages in the manuscript data.

(6) Notification Process by Notification Unit

Figure 18:
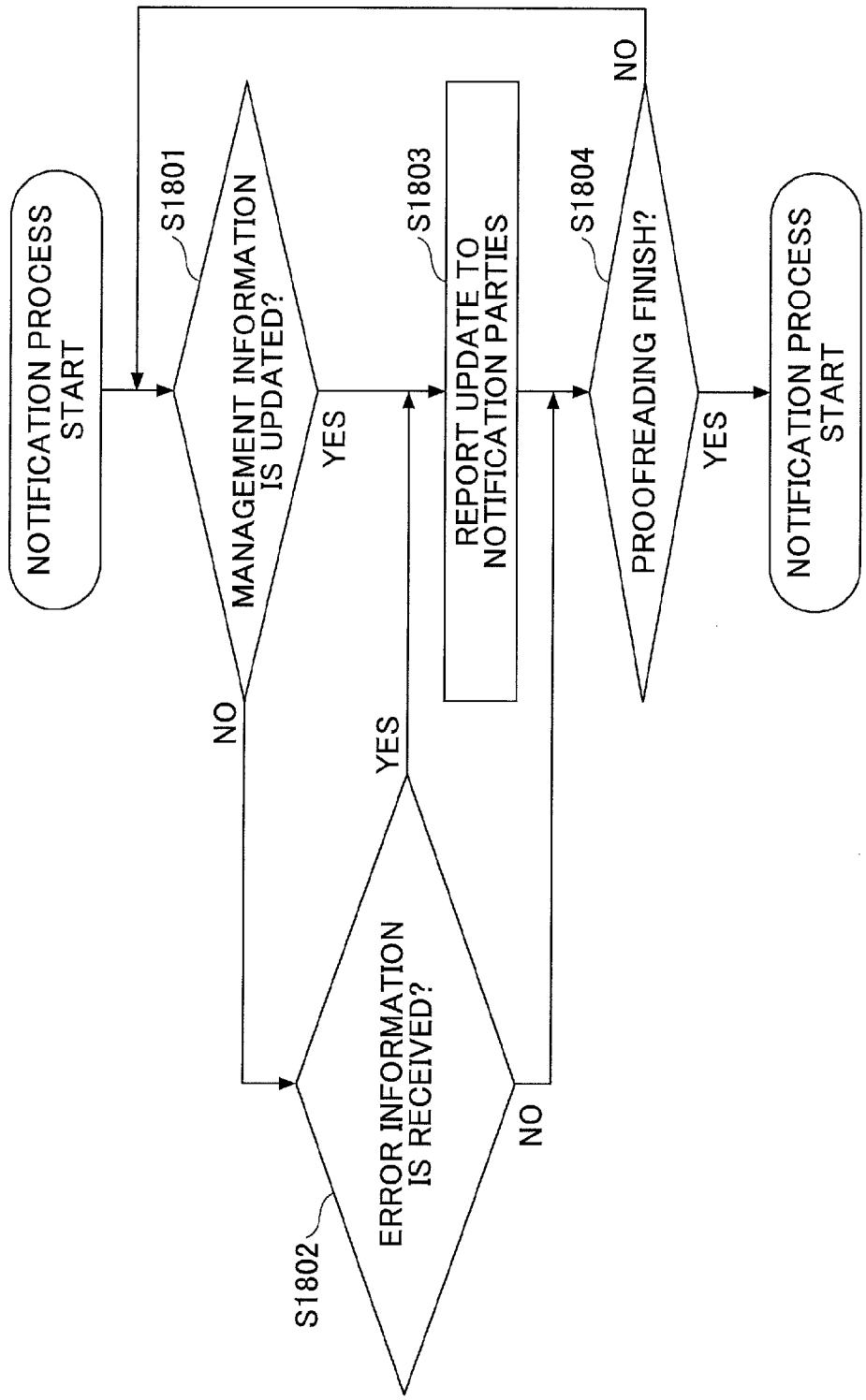
FIG. 18 is a flowchart for illustrating an example of a notification process.

In the following, a notification process performed by the notification unit 1105 will be described. FIG. 18 is a flowchart for illustrating an example of the notification process performed by the notification unit 1105.

In step S1801, the notification unit 1105 determines whether the management information 900 is updated (whether the updated content is reported from the registration unit 1101). In a case where the management information 900 is determined to be updated in step S1801, the process is proceeded to step S1803.

In step S1803, the notification unit 1105 reports the updated content to the parties recorded as "notification parties" in the management information 900. Additionally, for example, the notification unit 1105 reports the updated content as follows. In a case where "book code", "title", "editor/proofreader", "notification parties", "step", "date", "scanning data" or "proofreading paper format ID" is updated in the original manuscript step (step S206 shown in FIG. 2), the notification unit 1105 reports that new management information is recorded. Also, contents recorded in the new management information are reported. In a case where "manuscript data" is updated in the original manuscript step (step S210 shown in FIG. 2), the notification unit 1105 reports that new manuscript data is generated and the file name thereof. In a case where "step", "date" or "step code" is updated in the proofreading step (first) or the proofreading step (second) (step S211 shown in FIG. 2, step S301 or S316 shown in FIG. 3), the notification unit 1105 reports that the process is proceeded to the next step and the name of step, the date and the step code. In a case where "scanning data" is updated in the proofreading step (first) or the proofreading step (second) (step S221 shown in FIG. 2, or step S311 shown in FIG. 3), the notification unit 1105 reports that the scanning data is newly stored and the file name thereof. In a case where "manuscript data" is updated in the proofreading step (first) or the proofreading step (second) (step S225 shown in FIG. 2, or step S315 shown in FIG. 3), the notification unit 1105 reports that the manuscript data is corrected and the file name thereof. In a case where "proofreading finish" is updated in the finishing step (step S323 shown in FIG. 3), the notification unit 1105 reports that the proofreading is finished.

Descriptions are continued to be given with reference to FIG. 18. In a case here the management information 900 is determined not to be updated in step S1801, the process is proceeded to step S1802. In step S1802, the notification unit 1105 determines whether the error information is received form the scan control unit 1104. In a case where the error information is determined to be received in step S1802, the process is proceeded to step S1803.

In step S1803, the notification unit 1105 reports the error information to the parties recorded as "notification parties" in the management information 900. Additionally, in a case where the notification unit 1105 receives the scanning data in the proofreading step (first) or the proofreading step (second) (step S220 shown in FIG. 2 or step S310 shown in FIG. 3), for example, any of the following error information items is reported.

read error of the two-dimensional code
    error of mixing with another book's proofread manuscript
    error of mixing with another step's proofread manuscript
    error of sheet missing In step S1804, the notification unit 1105 determines whether the proofreading finish is reported, and the process is returned to step S1801 upon the notification unit 1105 determining that the proofreading finish is not reported. Meanwhile, the notification process of the management information 900 is ended upon the notification unit 1105 determining that the proofreading finish is reported.

<7. Summary>

As described above, the image processing system 100 of the present embodiment has the following functional configuration: the management information DB is disposed so as to manage the manuscript in the respective steps until the book is published; and in the printing process, the respective pages of the manuscript data are incorporated in the respective sheets of the proofreading paper format and the two-dimensional codes including information unique to the book, information unique to the step and information for identifying the sheet are attached.

Therefore, the properness of the sheet can be determined on a sheet-by-sheet basis in the manuscript data on which the printing process is performed. As a consequence, work mistakes (mixing with another book's or another step's proofread manuscript, sheet missing, etc.) that may occur before the scanning process is performed on the manuscript data on which the printing process has been performed can be prevented or reduced.

Also, in the image processing system 100 of the present embodiment, the check mark entry areas in which the check marks indicating proofreading finish are entered are disposed in the respective sheets of the proofreading paper format.

Thus, the proofread sheets are easily recognized. As a consequence, work mistakes (correction missing when correcting the manuscript based on the proofread sheet, etc.) that may occur before the manuscript data is generated based on the scanned manuscript can be prevented or reduced.

Further, the image processing system 100 of the present embodiment has the following functional configuration: mixing with another book's or another step's proofread manuscript, sheet missing, etc. can be automatically detected by reading the two-dimensional codes in the scanning process of the manuscript; and presence/absence of the check mark indicating the proofreading finish is automatically determined in the scanning process of the manuscript and the bookmark is inserted upon the presence of the check mark being determined.

Thus, the determination of the properness of the sheet on a sheet-by-sheet basis in the manuscript data on which the printing process has been performed and checks on the proofread sheets can be easily performed.

<Second Embodiment>

In the first embodiment, the properness of the book code, the step code, and the sheet number are determined in comparison to the book codes, the step codes, and the sheet numbers of other sheets in the scanning data check process. However, the manner in which the properness of the book code, the step code, and the sheet number are determined is not limited to the aforementioned manner. For example, the properness of the book code, the step code, and the sheet number may be determined in comparison to the respective sheets of the generated manuscript data for proofreading. In the following, the scan control process and the scanning data check process performed by the management server 110 of the second embodiment will be described.

Figure 19:
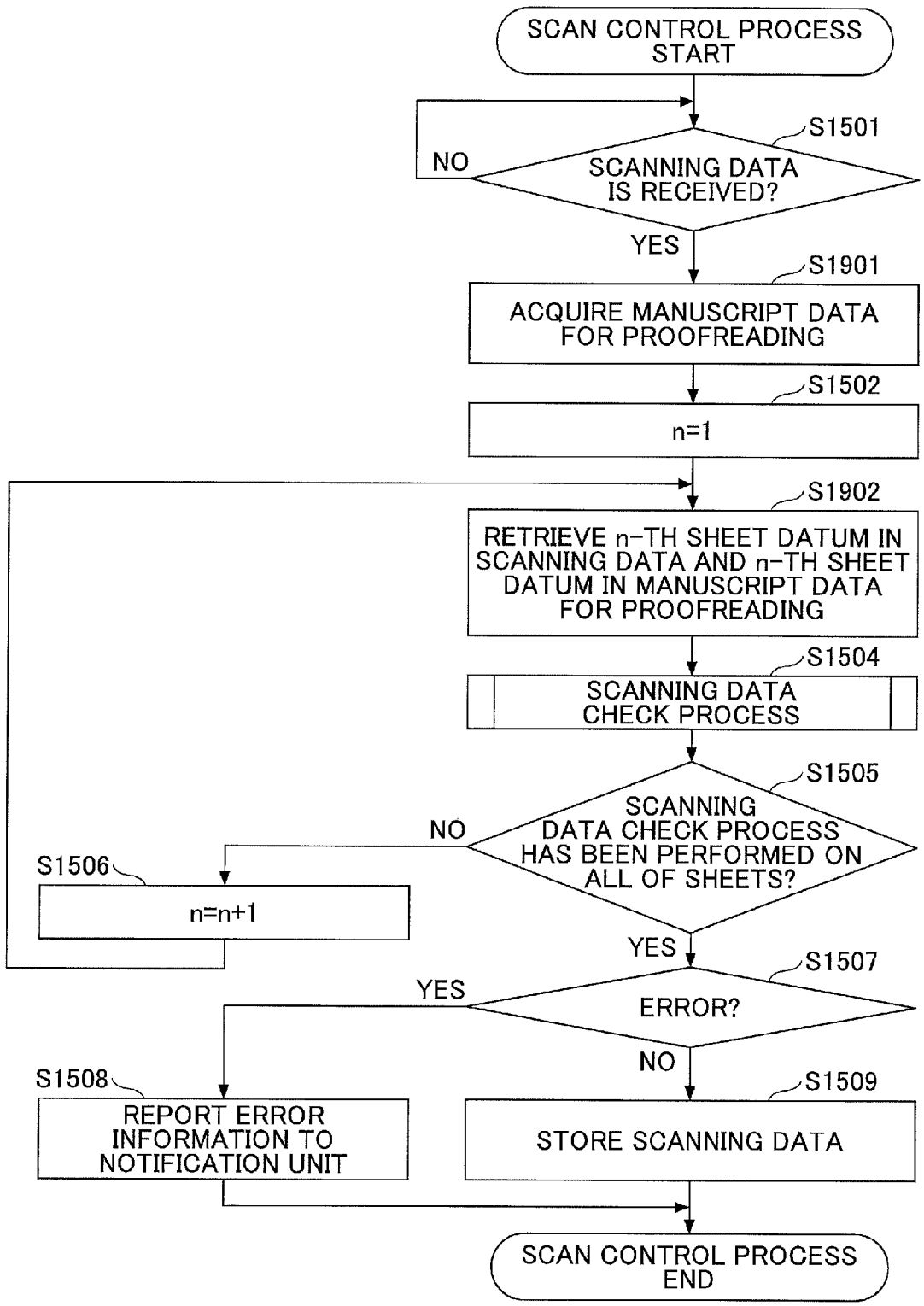
FIG. 19 is a flowchart for illustrating another example of a scan control process.

FIG. 19 is a flowchart for illustrating another example of the scan control process. Additionally, identical reference numerals will be applied to steps or the like shown in FIG. 19 that have substantially similar functions to those shown in FIG. 15, and descriptions thereof will be omitted.

The differences between FIG. 19 and FIG. 15 are steps S1901 and S1902. In a case where the scanning data generated through the scanning process performed on the proofread manuscript is determined to be received in step S1501, the scan control unit 1104 acquires, in step S1901, manuscript data for proofreading corresponding to the received scanning data. Specifically, the scan control unit 1104 retrieves the latest manuscript datum for proofreading among the manuscript data for proofreading recorded as "manuscript data for proofreading" in the management information 900.

In step S1902, the scan control unit 1104 retrieves the n-th sheet datum in the scanning data and the n-th sheet datum in the manuscript data for proofreading. Thus, the two-dimensional code of the n-th sheet in the scanning data and the two-dimensional code of the n-th sheet in the manuscript data for proofreading can be compared with each other in the scanning data check process performed in step S1504. Then, in a case where the two-dimensional code of the n-th sheet in the scanning data is the same as the two-dimensional code of the n-th sheet in the manuscript data for proofreading, the book code, the step code and the sheet number are determined to be proper. On the other hand, in a case where any of the book code, the step code and the sheet number read from the two-dimensional code in the scanning data is different from that read from the two-dimensional code in the manuscript data for proofreading, it is determined that an error occurs.

Additionally, for example, according to the determination manner of the present embodiment, the occurrence of the error can be effectively detected when only a part of sheets in the manuscript data for proofreading are printed out to be proofread. For example, in a case where from the 50th sheet to the 65th sheet of the manuscript data for proofreading are printed out to be proofread, only sheets which have been printed out may be retrieved in step S1801, where the scan control unit 1104 acquires the manuscript data for proofreading. Thus, in the scanning data check process performed in step S1504, the sheets in the scanning data can be compared with the corresponding sheets in the manuscript data for proofreading.

Thus, according to the present embodiment, in the scanning data check process, the properness of the book code, the step code, and the sheet number can be more precisely determined.

<Third Embodiment>

Figure 20:
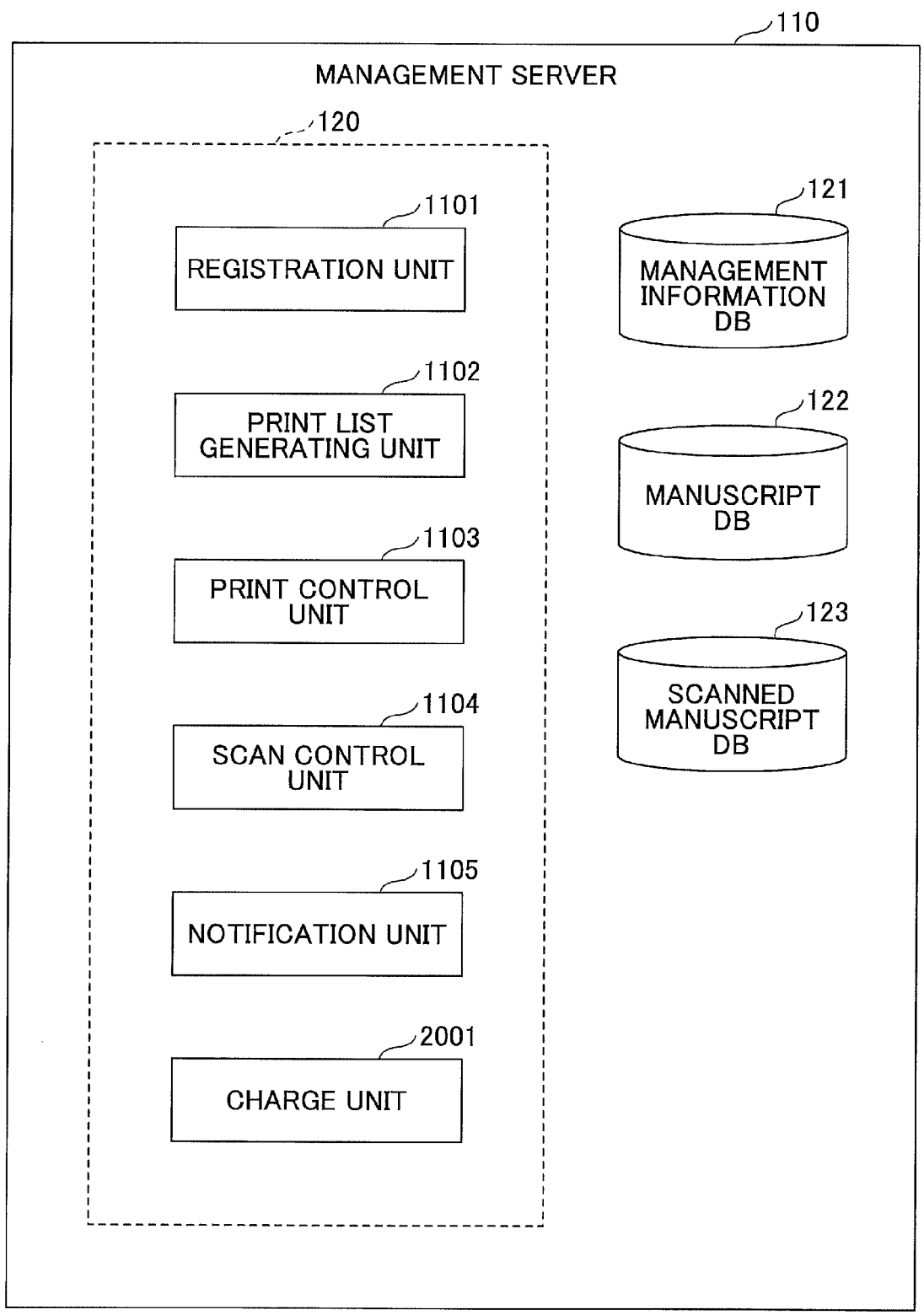
FIG. 20 is a block diagram for illustrating a functional configuration of a management server.

In the third embodiment, charge for using the management server 110 will be described. FIG. 20 is a block diagram for illustrating a functional configuration of the management server 110 of the third embodiment. Additionally, identical reference numerals will be applied to elements, units or the like shown in FIG. 20 that have substantially similar functions to those shown in FIG. 11, and descriptions thereof will be omitted.

The difference between FIG. 20 and FIG. 11 is a charge unit 2001. The charge unit 2001 charges fee based on communications made between the information terminal 130, the image processing apparatus 140 or the information terminal 150 and the management server 110. Additionally, the following methods are exemplified as the charging method of the charge unit 2001. A method in which the charge unit 2001 charges fee according to times accessing the management server 110. A method in which the charge unit 2001 charges fee according to time (period) using the management server 110. A method in which the charge unit 2001 charges fee according to times downloading (outputting) data stored in the management server 110. A method in which the charge unit 2001 charges fee according to amount of data downloaded from the management server 110. FIG. 21 is a sequence diagram for illustrating charge opportunities based on the sequence of the respective steps until the book is published shown in FIG. 2, where the aforementioned charging methods are adopted. In FIG. 21, rectangles 2101 and 2102 shown with dotted lines indicate the charge opportunities.

Respective circles indicate the charge opportunities for charging fee according to times downloading data or according to amount of the downloaded data. Respective triangles indicate other charge opportunities. That is, in a case where the method in which the charge unit 2001 charges fee according to times downloading data stored in the management server 110 or according to the amount of the downloaded data is adopted, the charge unit 2001 charges fee at timings shown by the respective circles. On the other hand, in a case where the method in which the charge unit 2001 charges fee according to times accessing the management server 110 or according to time (period) using the management server 110 is adopted, the charge unit 2001 charges fee at timings shown by the respective circles and the respective triangles.

Additionally, in FIG. 21, although charge opportunities are illustrated based on the sequence of the respective steps until the book is published shown in FIG. 2, the charge opportunities may be similarly illustrated based on the sequence of the respective steps until the book is published shown in FIG. 3. Also, notification to the parties may be charged as well.

As described above, according to the present embodiment, usage of the management server 110 can be charged.

<Fourth Embodiment>

In the embodiments described above, although the registration information is recorded in the management information stored in the management information DB 121 by the information terminal 130 or the information terminal 150, this is not a limiting example. For example, in step S210 and S225, the file name of the manuscript data and the storage address thereof may be recorded in the management information 900 by reporting the registration information from the manuscript DB 122 to the registration unit 1101 when the manuscript data is newly stored. Also, in step S221 and S311, the file name of the scanning data and the storage address thereof may be recorded in the management information 900 by reporting the registration information from the scanned manuscript DB 123 to the registration unit 1101 when the scanning data is newly stored.

Herein above, although the invention has been described with respect to a specific embodiment, the appended claims are not to be thus limited. It should be understood that the various changes, substitutions, and alterations could be made hereto without departing from the spirit and scope of the claims. Further, all or part of the components of the embodiments described above can be combined.

The present application is based on Japanese Priority Application No. 2014-223087 filed on Oct. 31, 2014, the entire contents of which are hereby incorporated herein by reference.

What is claimed is:

1. A management system for managing a manuscript of a book in a plurality of steps, works serially performed on the manuscript being divided into the steps, wherein one of the steps includes a first work for generating manuscript data and another step includes a second work for obtaining a manuscript for proofreading, the management system comprising:
   a memory configured to store a program; and
   a processor configured to execute the program to perform a process including,
   generating data for printing out sheets in response to receiving a print request of manuscript data, respective pages in the manuscript data being incorporated in the sheets, wherein the manuscript data is generated by digitizing the manuscript including the respective pages, and the respective sheets include identification information items which are made unique on a sheet-by-sheet basis and used for determining properness of the respective sheets, the identification information items indicating a step among the steps which includes a work most lately performed and a sequence number of the respective sheets; and
   determining properness of sheets in scanning data, which is generated by scanning the manuscript for proofreading proofread in the other step, the manuscript for proofreading being obtained by printing out the sheet through the second work, wherein the identification information items includes in the respective sheets of the scanning data is analysed to determine the properness of the sheets.

2. The management system as claimed in claim 1, wherein the identification information items are attached to the respective sheets in response to receiving the print request, the identification information items including a book code indicating the book and a step code indicating a step among the steps.

3. The management system as claimed in claim 2, wherein the identification information items further include;
   a code indicating a total number of the sheets for having the respective pages in the manuscript data incorporated therein, wherein the manuscript data is generated through the first work; and
   a code indicating a sequence number of the respective sheets.

4. The management system as claimed in claim 3, wherein the identification information items are attached at a plurality of positions in a sheet of the sheets, the attached identification information items being unique to the sheet.

5. The management system as claimed in claim 2, wherein an entry area is inserted in the respective sheets, the entry area being provided for entering a check mark indicating that the manuscript for proofreading obtained through the second work has been proofread.

6. The management system as claimed in claim 4, wherein the book code and the step code are extracted from the respective sheets of the scanning data through analysis of the attached identification information items, and the properness of the book code and the step code extracted from the respective sheets are determined.

7. The management system as claimed in claim 6, wherein the code indicating the sequence number of the respective sheets are further extracted through analysis of the identification information, and presence or absence of a sheet missing in the scanning data is determined.

8. The management system as claimed in claim 7, wherein the process further includes reporting information to parties registered as notification parties upon a work being performed in the respective steps, wherein the reported information indicates that the work is performed.

9. The management system as claimed in claim 8, wherein the determination result of the properness is reported to the notification parties.

10. An image processing apparatus connected to a management system for managing a manuscript of a book in a plurality of steps, works serially performed on the manuscript being divided into the steps, wherein one of the steps includes a first work for generating manuscript data and another step includes a second work for obtaining a manuscript for proofreading, the image processing apparatus comprising:
  a memory configured to store a program; and
  a processor configured to execute the program to perform a process including,
  transmitting a print request of manuscript data generated based on the manuscript;
  receiving data of sheets, respective pages in the manuscript data being incorporated in the sheets, wherein the manuscript data is generated by digitizing the manuscript including the respective pages, and the respective sheets include identification information items which are made unique on a sheet-by-sheet basis and used for determining properness of the respective sheets, the identification information items indicating a step among the steps which includes a work most lately performed and a sequence number of the respective sheets; and
  determining properness of sheets in scanning data, which is generated by scanning the manuscript for proofreading proofread in the other step, the manuscript for proofreading being obtained by printing out the sheet through the second work, wherein the identification information items included in the respective sheets of the scanning data is analysed to determine the properness of the sheets.

11. A method of generating manuscript for proofreading by an image processing system including a management system for managing a manuscript of a book in a plurality of steps, works serially performed on the manuscript being divided into the steps, wherein one of the steps includes a first work for generating manuscript data and another step includes a second work for obtaining a manuscript for proofreading, and an image processing apparatus connected to the management system, the method comprising the steps of:
  performing a print control process, by the management system, in which data for printing out sheets is generated in response to receiving a print request of manuscript data, respective pages in the manuscript data being incorporated in the sheets, wherein the manuscript data is generated by digitizing the manuscript including the respective pages, and the respective sheets include identification information items which are made unique on a sheet-by-sheet basis and used for determining properness of the respective sheets, the identification information items indicating a step among the steps which includes a work most lately performed and a sequence number of the respective sheets;
  transmitting, by the image processing apparatus, a print request of the manuscript data;
  printing out, by the image processing apparatus, sheets of the data output from the management system in response to the print request of the manuscript data; and
  determining, by the management system, properness of sheets in scanning data, which is generated by scanning the manuscript for proofreading proofread in the other step, the manuscript for proofreading being obtained by printing out the sheet through the second work, wherein the identification information items included in the respective sheets of the scanning data is analysed to determine the properness of the sheets.

12. The method of proofreading as claimed in claim 11, further comprising the step of
  charging the image processing apparatus, by the management system, according to times accessing the management system, according to period using the management system, according to amount of the output data of the sheets for having respective pages in the manuscript data incorporated therein, or according to times outputting the data of sheets.

* * * * *